(12) United States Patent
Harms et al.

(10) Patent No.: US 6,405,746 B2
(45) Date of Patent: *Jun. 18, 2002

(54) PROPORTIONAL PRESSURE CONTROL VALVE

(75) Inventors: Louis C. Harms, Evanston; Zilek Liberfarb, Morton Grove, both of IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/912,825

(22) Filed: Jul. 25, 2001

Related U.S. Application Data

(63) Continuation of application No. 09/667,093, filed on Sep. 21, 2000, now Pat. No. 6,286,535, which is a continuation of application No. 08/960,971, filed on Oct. 30, 1997, now abandoned, which is a continuation of application No. 08/598,285, filed on Feb. 8, 1996, now Pat. No. 5,836,335, which is a continuation of application No. 08/426,647, filed on Apr. 21, 1995, now abandoned, which is a continuation of application No. 08/034,188, filed on Mar. 22, 1993, now abandoned, which is a continuation of application No. 07/747,131, filed on Aug. 19, 1991, now abandoned.

(51) Int. Cl.$^7$ .............................................. F15B 13/043
(52) U.S. Cl. ................. 137/14; 137/596.2; 137/625.61; 137/625.64
(58) Field of Search .................. 137/14, 596.2, 137/625.61, 625.64

(56) References Cited

U.S. PATENT DOCUMENTS

| | | | |
|---|---|---|---|
| 3,029,830 A | 4/1962 | Klover et al. ....... | 137/625.62 X |
| 3,286,734 A | 11/1966 | Hartshorne ............ | 137/625.64 |
| 3,443,594 A | 5/1969 | Frayer ................... | 137/625.64 |
| 3,537,467 A | 11/1970 | Marshall ............ | 137/625.61 X |
| 3,856,047 A | 12/1974 | Takayama ............... | 137/625.61 |
| 4,313,468 A | 2/1982 | Patel ...................... | 137/625.61 |
| 4,527,592 A | 7/1985 | Dotti et al. ............. | 137/625.61 |
| 4,567,914 A | 2/1986 | Coppola et al. ........ | 137/625.64 |
| 4,674,613 A | 6/1987 | Sikorski ................. | 137/625.64 |
| 4,741,364 A | 5/1988 | Stoes et al. ............ | 137/625.64 |
| 4,785,849 A | 11/1988 | Masuda .................. | 137/625.64 |
| 4,875,501 A | 10/1989 | Ichihashi et al. ...... | 137/625.64 |
| 4,911,469 A | 3/1990 | Kawarasaki ................ | 280/707 |
| 4,922,964 A | 5/1990 | Buscher ............ | 137/625.61 X |
| 4,966,195 A | 10/1990 | McCabe ................. | 137/625.61 |
| 5,024,459 A | 6/1991 | Kokubo et al. ............. | 280/707 |
| 5,031,663 A | 7/1991 | Fukuta et al. ........ | 137/625.61 X |
| 5,042,832 A | 8/1991 | Takahashi et al. .. | 137/625.64 X |
| 5,051,631 A | 9/1991 | Anderson .......... | 137/625.64 X |
| 5,054,599 A | 10/1991 | Marcott ............. | 137/625.64 X |
| 5,062,454 A | 11/1991 | Ichihashi et al. ...... | 137/625.61 |
| 5,174,338 A | 12/1992 | Yokota et al. ......... | 137/625.64 |
| 5,836,335 A | 11/1998 | Harms ............... | 137/625.61 X |

FOREIGN PATENT DOCUMENTS

| | | | |
|---|---|---|---|
| GB | 2102158 | 1/1983 | ............ 137/625.64 |
| JP | 1-199081 | 8/1989 | ............ 137/625.64 |

*Primary Examiner*—Gerald A. Michalsky
(74) *Attorney, Agent, or Firm*—Roper & Quigg

(57) ABSTRACT

This invention generally concerns electronically controlled hydraulic valves for use in electro-hydraulically controlled transmissions. The proportional pressure control valve 20 includes a hollow cage 42 pierced by cage tank ports 52, cage clutch ports 54, and cage pump ports 56. The cage pump ports 56 receive fluid from a pump. The cage clutch ports 54 supply fluid to a hydraulic actuator. The cage tank ports 52 return fluid from the valve 20 to a tank from where fluid circulates back to the pump. Main spool 112 controls fluid flow between cage clutch ports 54 and cage pump ports 56 or cage tank ports 52. An electro-magnetically operated pilot valve regulates fluid pressure applied to a control pressure surface 138. A feedback pressure passage 126, having a feedback restriction orifice 128, restrains the rate fluid flows between the cage clutch ports 54 and the feedback pressure surface 114.

5 Claims, 11 Drawing Sheets

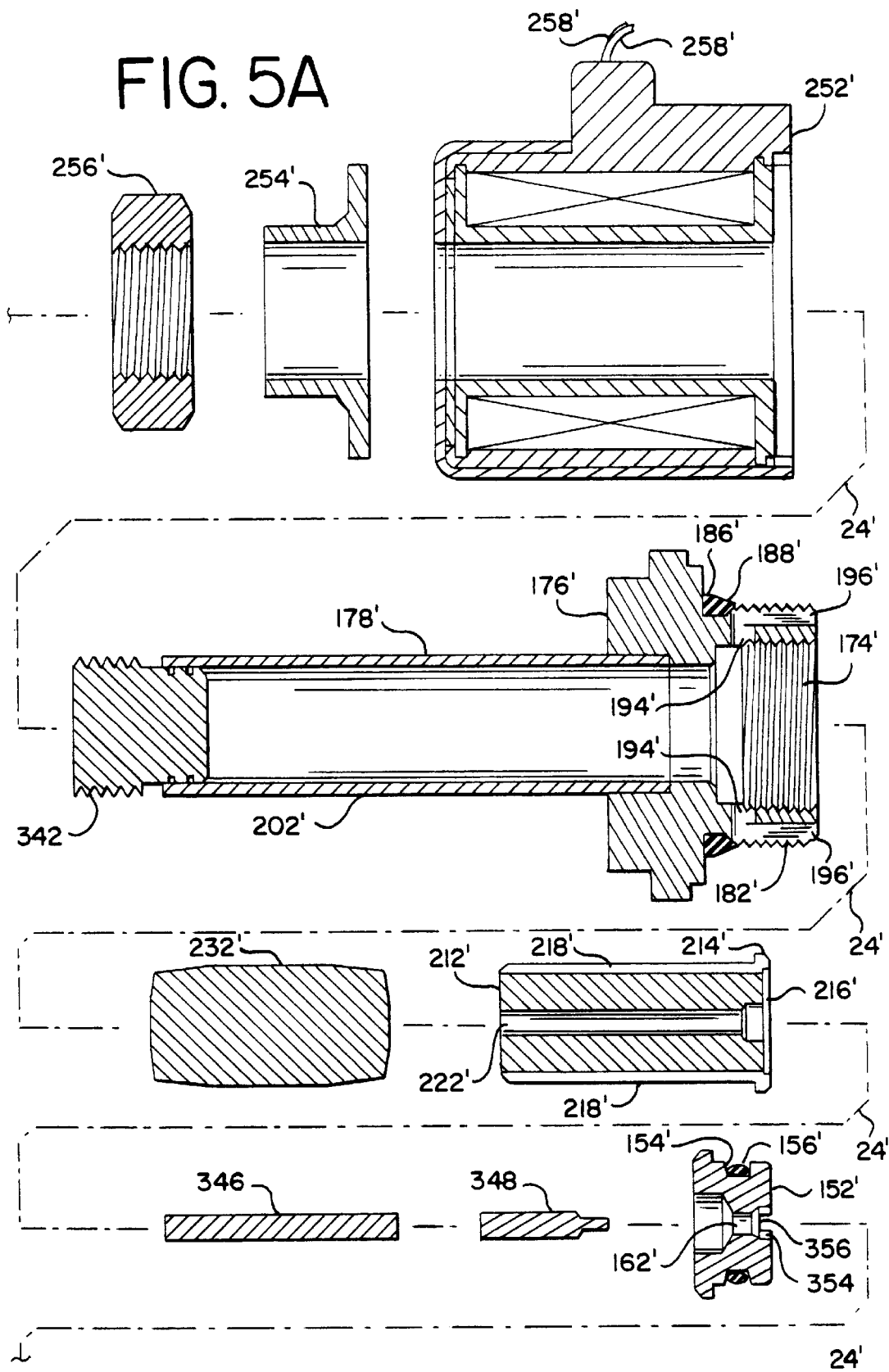

PROPORTIONAL PRESSURE CONTROL VALVE

This application is a continuation of prior application Ser. No. 09/667,093 filed Sep. 21, 2000, now U.S. Pat. No. 6,286,535 which in turn is a continuation of prior application Ser. No. 08/960,971 filed Oct. 30, 1997, now abandoned, which, in turn, was a continuation of prior application Ser. No. 08/598,285 filed Feb. 8, 1996, which issued as U.S. Pat. No. 5,836,335 on Nov. 17, 1998, which, in turn, was a continuation of prior application Ser. No. 08/426,647 filed Apr. 21, 1995, now abandoned, which, in turn, was a continuation of prior application Ser. No. 08/034,188 filed Mar. 22, 1993, now abandoned, which in turn was a continuation of prior application Ser. No. 07/747,131 filed Aug. 19, 1991, now abandoned. Pursuant to MPEP §201.06(c), the specification and drawings of application 08/960,971 are hereby incorporated herein by reference.

TECHNICAL FIELD

The present invention relates generally to the technical field of hydraulic control devices and, more particularly, to electrically controlled hydraulic valves.

BACKGROUND OF THE INVENTION

Automobiles, trucks, tractors, earth-moving vehicles, and many other different types of vehicles (hereinafter collectively referred to as automotive vehicles) frequently include an internal combustion engine for powering their movement across the earth's surface. An automotive vehicle also includes a drive train for transmitting energy produced by the internal combustion engine into movement of the wheels, drive tracks or similar means by which the vehicle is driven across the earth's surface. To effectively accommodate the power characteristics of the internal combustion engine to the load of the vehicle that it must drive at various speeds over varying terrain, an automotive vehicle's drive train usually includes one or more transmissions. Each transmission in an automotive vehicle includes a transmission power input shaft that receives energy from the internal combustion engine's power output shaft, and a transmission power output shaft for transmitting the engine's energy onto the means for driving the vehicle across the earth's surface. Each transmission in an automotive vehicle also includes sets of gears, each one of which, when selected for coupling the transmission's power input shaft to its power output shaft, provides a different speed ratio between the rotation rates, respectively, of the transmission's power input and power output shafts.

To facilitate selecting a particular gear ratio and for smoothly accelerating an automotive vehicle from a stationary start, its drive train usually includes a clutch located between the automotive vehicle's internal combustion engine and its transmission(s). This clutch selectively couples the internal combustion engine's power output shaft to the transmission's power input shaft. In one position of the clutch, it completely decouples the engine's power output shaft from the transmission's power input shaft. In another position, the clutch of an automotive vehicle provides a tight coupling between the internal combustion engine's power output shaft and the transmission's power input shaft. In this tightly coupled state, the internal combustion engine's power output shaft and the transmission's power input shaft rotate at the same speed. However, most clutches for automotive vehicles operating in this tightly coupled state are capable of passing only some maximum amount of torque from the internal combustion engine to the transmission without slippage occurring in the clutch. If a torque greater than this maximum amount is supplied to the clutch in its tightly coupled state, slippage occurs within the clutch that allows the power output shaft of the internal combustion engine to rotate at a speed different from that of the transmission's power input shaft.

Between these two extremes of clutch operation, either of being decoupled or of being tightly coupled, the design of most clutches used in automotive vehicles permit progressively varying the tightness of coupling between the engines's power output shaft and the transmission's power input shaft. In intermediate states between these two extremes, the clutch will transmit an amount of torque to the transmission without slippage that is less than the maximum amount that it will transmit when tightly coupled. Controllably coupling differing amounts of torque from the internal combustion engine to the means for driving the vehicle across the earth's surface permits smoothly accelerating an automotive vehicle into motion. Controllably coupling different amounts of torque from the internal combustion engine to the means for driving the vehicle through the clutch is also useful, particularly for heavy industrial vehicles such as trucks, tractors and the like when shifting the transmission smoothly from a set of gears having one ratio to another set having a different ratio.

Historically, a driver of an automotive vehicle usually operated its clutch through a direct mechanical linkage between the clutch and a clutch pedal located in the vehicle's passenger compartment near the driver. In some instances, a closed hydraulic system for operating the clutch by pressure on the clutch pedal replaces the direct mechanical linkage. More recently, to provide automatic electronic control of gear ratio selection, particularly in automotive vehicle's that include a microprocessor, it has become desireable to control clutch operation by means of an electrical signal rather than by the driver pressing on a clutch pedal. While some designs for clutches are known that permit an electrical current to directly effect coupling and uncoupling of the clutch, such clutches generally consume, and must therefore also dissipate, a significant amount of electrical power. Thus, even with microprocessor controlled operation of an automotive vehicle's transmission, it still appears desirable to continue controlling clutch operation indirectly by converting a control electrical signal from the microprocessor into a more powerful mechanical driving force for directly operating a conventional clutch.

In pursuing this indirect electronic control of automotive vehicle clutches, some automotive vehicle manufactures have chosen to employ electro-hydraulic transmissions having hydraulically operated clutches. In such electro-hydraulic transmissions, a hydraulic pump supplies pressurized hydraulic fluid for energizing a hydraulic actuator, for example a piston or a bellows, that directly operates the clutch. In one design for such a clutch, springs hold the clutch in its disengaged position and a carefully controlled pressure of the hydraulic fluid from the pump overcomes the springs' force to effect engagement of the clutch. When the hydraulic pressure is removed from this clutch, the springs once again move the clutch into its disengaged state. By using the spring pressure to effect clutch disengagement and hydraulic pressure to effect clutch engagement, the clutch inherently disconnects the engine from the transmission when the engine is not running to power the hydraulic fluid pump. Furthermore, this method of operating an electro-hydraulic clutch inherently avoids creating a hazardous condition if the hydraulic fluid pump fails. With such an electro-hydraulically operated clutch, smoothly accelerating the vehicle into motion and smoothly shifting transmission gear ratios require a hydraulic valve that controls the pressure of the hydraulic fluid supplied to the clutch precisely in response to changing values of the controlling electrical signal.

U.S. Pat. No. 4,996,195 entitled "Transmission Pressure Regulator" issued on Oct. 30, 1990 to Ralph P. McCabe ("the McCabe patent") and discloses a valve for controlling the pressure of a fluid medium that is adapted for use in a control system such as that of an automatic transmission of an automotive vehicle.

The valve disclosed in the McCabe patent includes a cylindrically shaped, elongated, hollow aperture means or cage. Formed through the wall of the cage toward one end is a first set of apertures or ports. This first set of ports receives a supply pressure of hydraulic fluid, apparently from a pump (not depicted or described in the text or drawings of the McCabe patent). A second set of apertures or ports also passes through the wall of the aperture means or cage. The second set of ports is displaced laterally from the first set of ports along the length of the cage and located near the middle of the length of the cage. The hydraulic fluid in the second set of ports has a control pressure and, apparently, is supplied to the automatic transmission (not depicted or described in the McCabe patent). A third set of apertures or ports is formed in the wall of the cage. The third set of ports is displaced laterally along the length of the cage from both the first and second sets of ports and is located near the end of the cage furthest from the first set. The hydraulic fluid in this third set of ports has a sump or tank pressure, and appears to return from the valve to a tank (not depicted or described in the McCabe patent).

The inner surface of the cage is formed in the shape of a right, circular cylinder and receives a snugly fitting main spool. The spool is much shorter than the cage and can, therefore, move laterally back and forth within the cage while remaining totally enclosed therein. A broad trough encircles the outer surface of the spool about its mid-section to establish a first chamber between the outer surface of the spool and the inner surface of the cage. The width of this trough along the length of the spool permits the first chamber to couple immediately adjacent pairs of sets of ports to each other while not simultaneously coupling all three sets of ports to each other. As depicted in FIGS. 1 and 2 of the McCabe patent, when the spool is fully displaced toward the right, the first chamber couples the second set of apertures, i.e., the clutch ports, to the third set of apertures, i.e., the tank ports. Alternatively, when the spool is fully displaced toward the left, the first chamber couples and first set of apertures, i.e., the pump ports, to the second set of apertures, i.e., the clutch ports. Thus, precisely controlled motion of the main spool laterally within the cage couples the set of clutch ports either to the set of pump ports or to the set of tank ports, and, as described in the McCabe patent, can thereby control the hydraulic fluid pressure in the clutch ports.

As depicted in FIGS. 1 and 2 of the McCabe patent, the outer surface of the spool is also encircled by a narrow trough located near its left end. This narrow trough establishes a second chamber between the outer surface of the spool and the inner surface of the cage. The second chamber appears to be always open to a flow of hydraulic fluid from the pump through the pump ports though the wall of the cage.

Located in the interior of the spool disclosed in the McCabe patent is a hollow first internal passage. The formation of this passage in the spool establishes a cup-shaped cavity that is open toward the right end of the spool and closed at the spool's left end. A passage, formed through the wall of the spool, connects this cup-shaped cavity to the second chamber. From FIGS. 1 and 2 of the McCabe patent, it appears that the first internal passage in the spool always receives a flow of hydraulic fluid from the pump through the pump ports in the cage and the second chamber regardless of the lateral position of the spool along the length of the cage.

The spool disclosed in the McCabe patent also includes a second internal passage that pierces both the wall of the broad trough and the left end surface of the spool. This second internal passage couples the pressure of hydraulic fluid in the first chamber to a second cavity located at the left end of the spool between the spool and an end cap. The end cap closes the end of the cage to the left of the spool and seals the second cavity so that fluid may enter and leave it only through the second internal passage. Because the second cavity opens only into the second internal passage, the pressure within this second cavity always equals the pressure of fluid within the first chamber. The end cap also compresses a first coil spring between its inner surface and the left hand surface of the spool. In the absence of any other force on the spool, this first coil spring urges the spool toward the right end of the cage as depicted in FIGS. 1 and 2 of the McCabe patent.

An annularly shaped poppet valve plate is located immediately to the right of the spool as depicted in FIGS. 1 and 2 of the McCabe patent, and partially obscures the right hand end of the cylindrically shaped interior of the cage. The full pressure of hydraulic fluid applied by the pump to the pump ports forces hydraulic fluid through the pump ports in the wall of the cage, the second chamber, and the first internal passage in the spool to the side of the poppet plate immediately adjacent to the right hand end of the spool. A second coil spring is compressed between the spool and the poppet plate at the right end of the spool and, according to the text of the McCabe patent, applies a force to the spool that is smaller than that applied by the first coil spring at the left end of the spool.

Located to the right of the poppet plate is a movable armature that is surrounded by a solenoid coil. An electrical current flowing through the coil applies a magnetic force to the armature. In the valve depicted in FIG. 1 of the McCabe patent, this electromagnetic force on the armature urges it to move laterally toward the left which tends to close the opening in the center of the annularly shaped poppet valve.

According to the text of the McCabe patent, closure of the poppet valve increases the pressure of the hydraulic fluid at the right end of the spool adjacent to the poppet plate. With the spool urged to the right end of the cage by the first coil spring, an increase in hydraulic fluid pressure on the right end of the spool urges it to move laterally to the left away from the poppet plate. Movement of the spool to the left causes the first chamber to move laterally away from the tank ports toward the pump ports. Lateral movement of the first chamber over the pump ports permits hydraulic fluid to flow from the pump ports to the clutch ports thereby increasing the pressure of the hydraulic fluid in the clutch ports. Increased pressure of the hydraulic fluid in the clutch ports is coupled via the second internal passage to the second cavity thereby increasing the pressure of the hydraulic fluid in the second cavity at the left end of the spool. An increasing pressure in the second cavity urges the spool to halt its lateral movement to the left away from the poppet plate and urges it to begin moving back to the right toward the poppet plate. According to the text to the McCabe patent, "the spool . . . will move axially in relation to the poppet plate . . . until the sum of the forces on the spool . . . are in equilibrium." The text of the McCabe patent also states that the second coil spring compressed between the poppet plate and the spool acts to reduce lateral oscillation of the spool due to changes in the pressure of hydraulic fluid at opposite ends of the spool. Thus, according to the McCabe patent, the combination of the poppet valve at the right end of the spool with the second internal passage in the spool and the second cavity at the left end of the spool along with the second coil spring, precisely controls the movement of the main spool laterally within the cage to adjust the pressure in the clutch ports.

Based upon the preceding description of the operation of the valve depicted in FIG. 1 of the McCabe patent, that valve may be characterized as a normally closed valve that couples the clutch ports to the tank ports when no current flows through the coil. Conversely, the valve depicted in FIG. 2 of the McCabe patent includes a spring which biases the poppet valve closed, and a magnetic field generated by an electric current flowing through the coil urges the armature to move toward the right thereby opening the poppet valve. According to the text of the McCabe patent, the hydraulic pressure applied to the right end of the spool of the valve depicted in FIG. 2 when no current flows through the coil causes the spool to move to the left thereby causing the first chamber to couple the clutch ports to the pump ports. Thus the valve embodiment depicted in FIG. 2 of the McCabe patent may be characterized as a normally open valve that couples the clutch ports to the pump ports when no current flows through the coil.

The text of the McCabe patent appears to lack an explanation of how closing and opening of the poppet valve depicted in the drawings of the patent may increase or decrease the pressure of hydraulic fluid present at the right end of the spool adjacent to the annularly shaped poppet plate. Accordingly, it appears that the valve disclosed in the McCabe patent may be commercially impractical for its intended purpose of controlling the pressure of hydraulic fluid in an automatic transmission of an automotive vehicle.

U.S. Pat. No. 4,996,195 entitled "Pilot-Operated Valve With Load Pressure Feedback" issued on May 3, 1988 to Kenneth J. Stoss and Richard A Felland ("the Stoss et al. patent") discloses a pilot-operated electro-hydraulic valve adapted for use in controlling a transmission of an automotive vehicle. The valve disclosed in the Stoss et al. patent includes an electromagnetically controlled pilot valve that controls the operation of the valve's main spool. A pilot feedback passage couples the pressure of hydraulic fluid in the load or clutch port of the valve to a feedback chamber at one end of the pilot valve. The Stoss et al. patent discloses that a pilot feedback passage coupling the clutch port to the feedback chamber preferably includes a filtered orifice. The Stoss et al. patent appears to omit an explanation of the function provided by the filtered orifice.

Neither the McCabe patent nor the Stoss et al. patent disclose or solve a problem that occurs in the operation of clutches in electro-hydraulic transmissions known as spiking. Spiking is a phenomenon that results from abruptly halting fluid flow though a hydraulic system. Fluid flowing through a hydraulic system has two types of energy. Those two different types of energy are potential energy and kinetic energy. Potential energy is energy that is present due to the pressure of hydraulic fluid. Kinetic energy is energy that is present due to the flow of fluid through the hydraulic system. When a clutch, or any other hydraulically operated device that is moving in response to a flow of hydraulic fluid reaches the mechanical limit of its travel, the hydraulic fluid flow through the system stops abruptly. This abrupt stopping of hydraulic fluid flow converts the fluid's kinetic energy into potential energy thereby producing a sudden and abnormal increase, or spike, in the pressure of the hydraulic fluid. Under appropriate circumstances, this pressure spike may be heard audibly as a disturbing or alarming noise, and the pressure increase may be so severe that is causes failure of the hydraulic system.

SUMMARY OF THE INVENTION

The present invention provides a commercially practical electrically energized, hydraulic proportional pressure control valve for use in electro-hydraulic transmissions having hydraulically operated clutches.

An object of the present invention is to provide a fully operable electrically energized, hydraulic proportional pressure control valve for use in electro-hydraulic transmissions.

Another object of the present invention is to provide an electrically energized, hydraulic proportional pressure control valve that controls the pressure in its clutch port precisely in response to changing values of the controlling electrical signal.

Yet another object of the present invention is to provide an electrically energized, hydraulic proportional pressure control valve that relieves the abnormally high hydraulic fluid pressure spike that occurs when a flow of hydraulic fluid through the valve stops abruptly.

Another object of the present invention is to provide an electrically energized, hydraulic proportional pressure control valve that reduces the abnormally high hydraulic fluid pressure spike that occurs when a flow of hydraulic fluid through the valve stops abruptly.

Another object of the present invention is to provide a simpler electrically energized, hydraulic proportional pressure control valve.

Another object of the present invention is to provide a more easily manufactured electrically energized, hydraulic proportional pressure control valve.

Another object of the present invention is to provide a more economical electrically energized, hydraulic proportional pressure control valve.

Another object of the present invention is to provide an electrically energized, proportional pressure control valve that, when used in conjunction with a clutch, provides improved and smooth engagement and disengagement of a load through precise control of fluid pressures within a hydraulic system.

A further object of the present invention is to provide an electrically energized, proportional pressure control valve that has an improved pilot valve section allowing precise control of fluid pressures within a hydraulic system.

Another object of the invention is to provide an electrically energized, proportional pressure control valve that has an improved ball type pilot valve section which allows precise control of fluid pressures within a hydraulic system and substantially reduced the cost of such a valve.

A further object of the invention is to provide an electronically energized, proportional pressure control valve that includes improved feedback means to dampen oscillation within the valve.

Briefly a proportional pressure control valve in accordance with the present invention includes a hollow cage having a wall that is pierced by a pump port, by a clutch port, and by a tank port. The pump port receives hydraulic fluid from a pump at a pressure provided by the pump. The clutch port is adapted for supplying pressurized hydraulic fluid to a hydraulic actuator at a pressure that is controlled by the proportional pressure control valve. The tank port of the cage returns hydraulic fluid from the proportional pressure control valve to a tank from which the fluid circulates back to the pump.

The proportional pressure control valve also includes a main spool adapted to fit snugly within the cage. Contained within the cage, the main spool is movable along the length of the cage for controlling a flow of hydraulic fluid passing between the clutch port and either the pump port or the tank port.

An electromagnetically operated pilot valve regulates a control pressure of hydraulic fluid that is present in a control pressure chamber of the proportional pressure control valve. The pressure of the fluid in the control pressure chamber is applied to a control pressure surface of the main spool. Pressure applied to the control pressure surface urges the main spool to move along the length of the cage to a position in which it allows hydraulic fluid to flow between the pump port and the clutch port. When disposed in such a position, the main spool obstructs any flow of hydraulic fluid between the clutch port and the tank port.

A feedback pressure passage couples the pressure of hydraulic fluid in the clutch port of the proportional pressure control valve to a feedback pressure chamber. The feedback pressure chamber applies the pressure of hydraulic fluid in the clutch port to a feedback surface of the main spool. Pressure applied to the feedback surface of the main spool urges the main spool to move within the cage to a position in which it allows a flow of hydraulic fluid to pass between the clutch port and the tank port. When disposed in such a position, the main spool obstructs any flow of hydraulic fluid between the pump port and the clutch port. The feedback pressure passage includes a feedback restriction orifice for restraining the rate at which fluid may flow between the clutch port and the feedback pressure chamber.

An embodiment of the proportional pressure control valve of the present invention includes a pressure spike suppression check valve for relieving any abnormally high pressure that occurs in the clutch port of the cage. Such an abnormally high pressure may occur if a flow of hydraulic fluid through the clutch port stops abruptly. In the preferred form of this embodiment, the check valve allows hydraulic fluid to flow from the cage clutch port to the cage tank port when an abnormally high pressure occurs in the clutch port. A spike suppression orifice may also be included to restrain the rate at which fluid may flow though the check valve.

These and other features, objects and advantages will be understood or apparent to those of ordinary skill in the art from the following detailed description of the preferred embodiment as illustrated in the various drawing figures.

DETAILED DESCRIPTION OF THE INVENTION

Figure 1A:
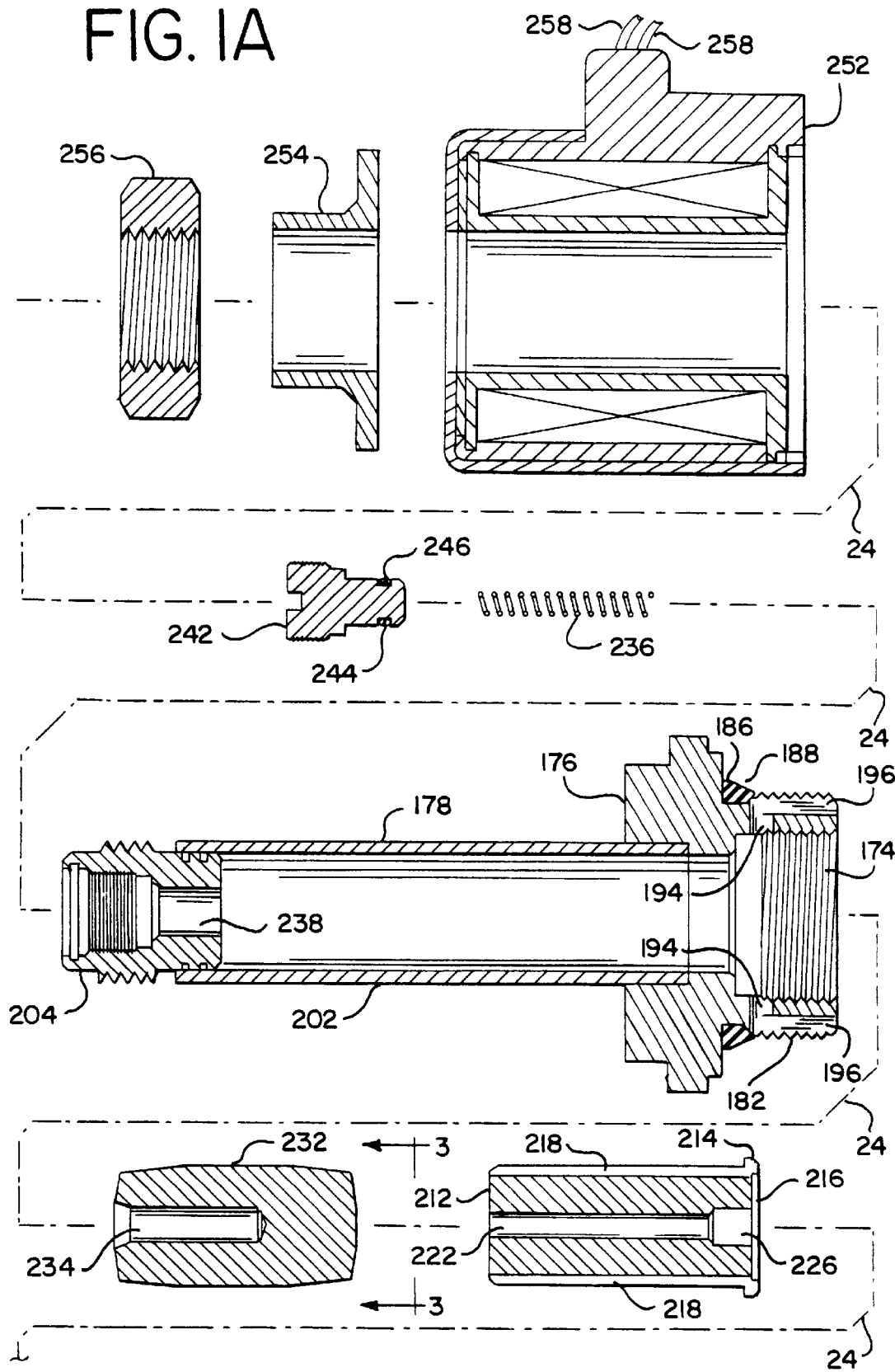
FIG. 1, made up of FIGS. 1A and 1B, is an exploded, cross-sectional plan view of a normally closed proportional pressure control valve constructed in accordance with the present invention that is adapted for control by an analog electrical control signal.
Figure 1B:
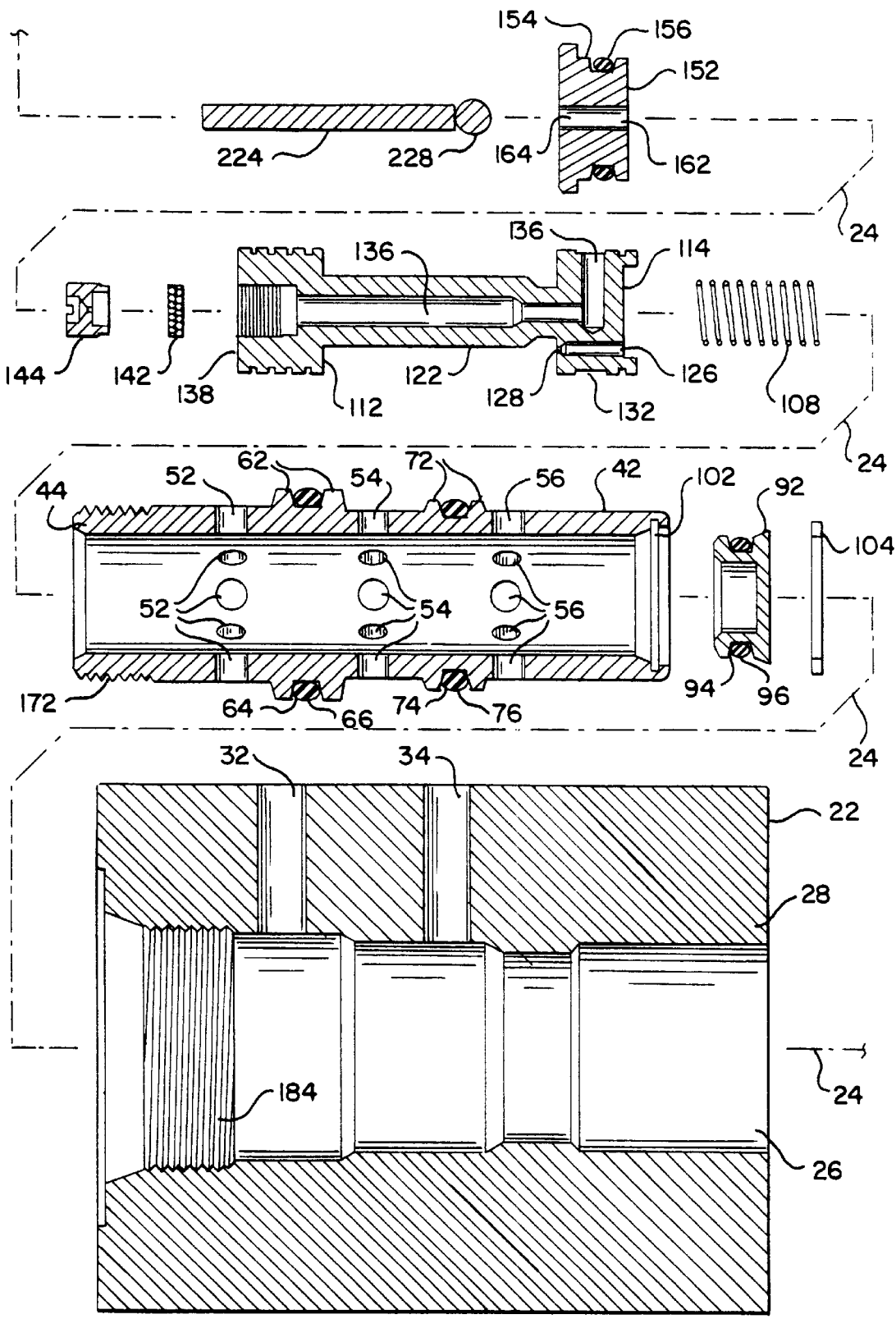
Figure 2:
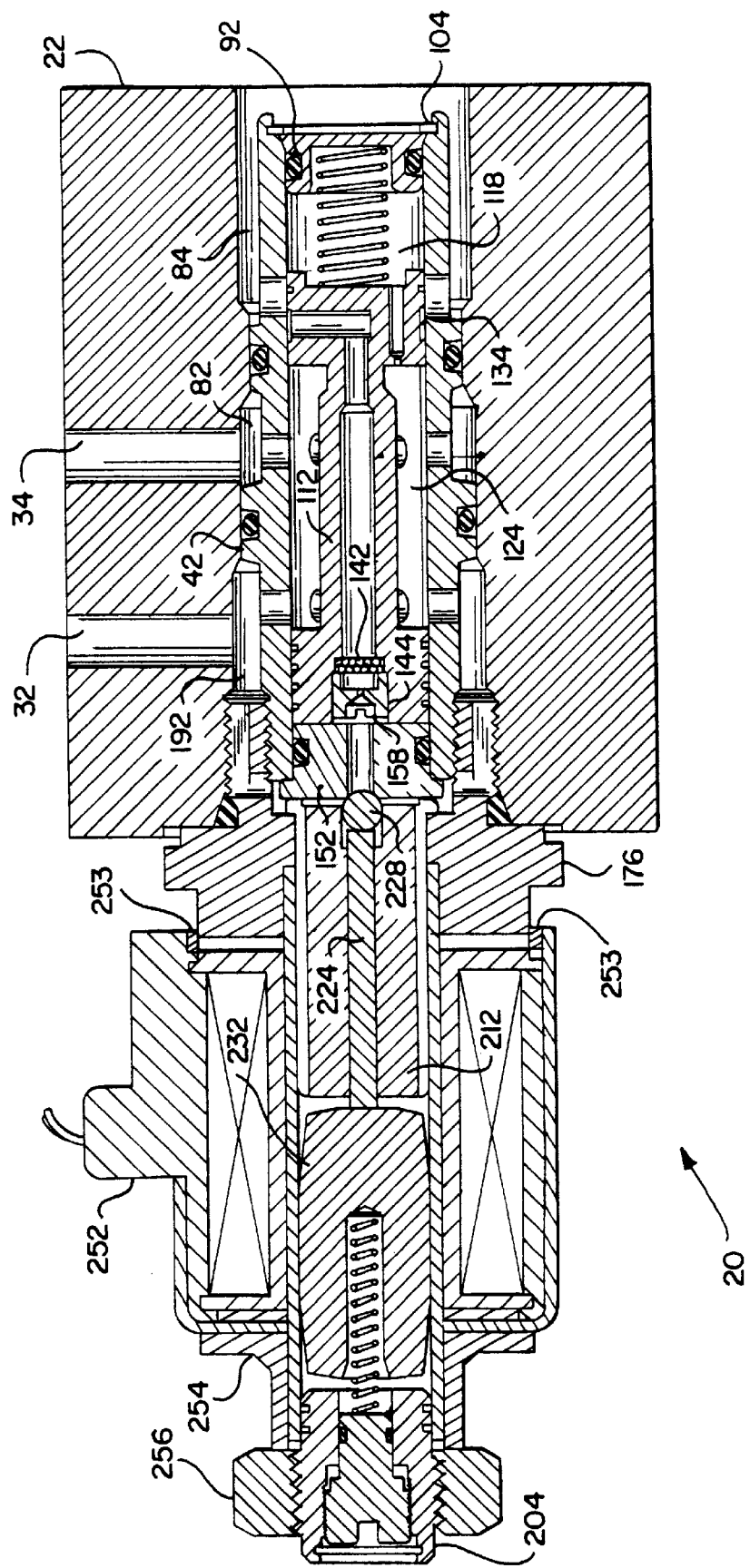
FIG. 2 is a cross-sectional plan view of the assembled proportional pressure control valve depicted in FIG. 1.

FIG. 2 depicts a cross-sectional plan view of a normally closed proportional pressure control valve referred to by the general reference character 20. FIG. 1, made up of FIGS. 1A and 1B, is an exploded, cross-sectional plan view depicting the various parts included in the proportional pressure control valve 20. The same reference characters are used to identify the same part of the proportional pressure control valve 20 both in FIG. 1 and in FIG. 2.

The proportional pressure control valve 20 includes a body 22. Formed in the center of the body 22, symmetrically about a center line 24 that appears only in FIG. 1, is a cylindrically-shaped cavity 26. Surrounding the cavity 26 is a body wall 28 that is pierced by a body tank port 32 and a body clutch port 34. During normal operation of the proportional pressure control valve 20, the pressure of hydraulic fluid in the body tank port 32 is very low because the body tank port 32 connects to an unpressurized hydraulic fluid reservoir (not depicted in any of the FIGS.).

The cavity 26 is formed to receive a cylindrically-shaped, elongated, hollow cage 42 having a cylindrically-shaped cage wall 44. Formed though the cage wall 44, toward one end of the cage 42, is a set of cage tank ports 52. Displaced laterally along the length of the cage 42 from the cage tank ports 52 and located approximately about the middle of the cage 42 is a set of cage clutch ports 54 that pass through the cage wall 44. Displaced even further laterally along the length of the cage 42 from the cage tank ports 52 than the cage clutch ports 54 is a set of cage pump ports 56 that also pass throught the cage wall 44. The cage wall 44 between the cage tank ports 52 and the cage clutch ports 54 includes a pair of raised lands 62 that encircle the cage 42. The lands 62 establish a U-shaped trough 64 that also encircles the cage 42 and receives an encircling O-ring 66. Similarly, the cage wall 44 between the cage clutch ports 54 and the cage pump ports 56 includes another pair of raised lands 72 that encircle the cage 42. The lands 72 establish another U-shaped trough 74 that encircles the cage 42 and receives another encircling O-ring 76.

When the cage 42 is inserted into the cavity 26 in the body 22, the surface of the cavity 26 receives the raised outer surface of the lands 62 and 72, and the O-rings 66 and 76 seal between the surface of the cavity 26 and the outer surface of the cage wall 44. With the cage 42 disposed in this position within the body 22, the surface of the cavity 26 and the outer surface of the cage wall 44 between immediately adjacent lands 62 and 72 established a hollow, annularly-shaped clutch outlet chamber 82 that encircles that cage 42. Hydraulic fluid, that is applied to a hydraulic actuator (not depicted in any of the FIGS.), flows between the cage clutch ports 54 and the body clutch port 34 through the clutch outlet chamber 82. On the opposite side of the lands 72 from the clutch outlet chamber 82, the surface of the cavity 26 and the outer surface of the cage wall 44 establish a hollow, annularly-shaped pump inlet chamber 84 that also encircles the cage 42. The pump inlet chamber 84 receives pressurized hydraulic fluid from a pump (not depicted in any of the FIGS.) and supplies it to the interior of the cage 42 through the cage pump ports 56.

A cup-shaped plug 92 fits snugly within the interior surface of the cage wall 44 at the end of the cage 42 nearest the cage pump ports 56. A u-shaped trough 94 encircles the plug 92 and receives an O-ring 96. The O-ring 96 seals between the inner surface of the cage wall 44 and the outer surface of the plug 92. The inner surface of the cage wall 44 immediately adjacent to the plug 92 includes a U-shaped groove 102. The groove 102 receives a snap ring 104 that mechanically retains the plug 92 within the cage 42. Secured in this location, the plug 92 closes the interior surface of the cage 42 between the plug 92 and the cage pump ports 56 formed through the cage wall 44. Received within the cage 42 abutting the plug 92 is a coil spring 108.

The inner surface of the cage wall 44 is formed in the shape of a right, circular cylinder to receive a snugly fitting main spool 112. While the length of the main spool 112 is shorter than that of the cage 42, the main spool 112 nevertheless abuts the end of the coil spring 108 furthest from the plug 92 to compress the coil spring 108 between the plug 92 and a feedback pressure surface 114 of the main spool 112. The pressure of the coil spring 108 against the feedback pressure surface 114 urges the main spool 112 to move laterally along the length of the cage 42 away from the plug 92.

When the main spool 112 is properly disposed within the cage 42, the plug 92, the feedback pressure surface 114 of the main spool 112, and the interior surface of the cage wall 44 between the plug 92 and the feedback pressure surface 114 establish a feedback pressure chamber 118. In addition to the coil spring 108, any hydraulic fluid pressure within the feedback pressure chamber 118 also urges the main spool 112 to move laterally along the length of the cage 42 away from the plug 92.

A broad, U-shaped trough 122 encircles the outer surface of the main spool 112 about its mid-section. When the main spool 112 is properly disposed within the cage 42, the outer surface of the main spool 112 formed by the trough 122 and the inner surface of the cage wall 44 establish a hollow, annularly-shaped valving chamber 124 that encircles the main spool 112. A sufficiently large lateral movement of the main spool 112 toward the plug 92 allows hydraulic fluid to flow through valving chamber 124 between the cage pump ports 56 and the cage clutch ports 54 while the outer surface of the main spool 112 simultaneously obscures the cage tank ports 52 thereby obstructing hydraulic fluid flow through the cage tank ports 52. Alternatively, a sufficiently large lateral movement of the main spool 112 away from the plug 92 allows hydraulic fluid to flow through the valving chamber 124 between the cage clutch ports 54 and the cage tank ports 52 while the outer surface of the main spool 112 simultaneously blocks any substantial flow of hydraulic fluid between the cage pump ports 56 and the cage clutch ports 54. Thus, controlled movement of the main spool 112 laterally along the length of the cage 42 couples the cage clutch ports 54 either to the cage pump ports 56 or to the cage tank ports 52.

A feedback pressure passage 126 is formed into the end of the main spool 112 adjacent to the coil spring 108 and the plug 92. A feedback restriction orifice 128, formed at the end of the feedback pressure passage 126 furthest from the coil spring 108 and the plug 92, passes through the surface of the trough 122 thereby coupling the feedback pressure passage 126 to valving chamber 124. Because the cage clutch ports 54 always open into the valving chamber 124, the feedback pressure passage 126 continuously couples the pressure of hydraulic fluid in the cage clutch ports 54 through the main spool 112 to establish a feedback pressure for the hydraulic fluid within the feedback pressure chamber 118. The feedback restriction orifice 128 in the feedback pressure passage 126 restrains the rate at which hydraulic fluid may flow between the valving chamber 124 and the feedback pressure chamber 118. The feedback restriction orifice 128 is sized dependant upon flow rate of fluid within the system as well as the size of the main spool 112 to provide acceptable overshoot spike suppression and operational stability of the system. To accomplish these intended purposes, feedback restriction orifice 128 is approximately about 0.020" to about 0.040" in diameter.

The outer surface of the main spool 112 between the trough 122 and the feedback pressure surface 114 is also encircled by a narrow trough 132. This narrow trough 132 establishes a hollow, annularly-shaped pilot valve supply chamber 134 encircling the main spool 112 between the outer surface of the main spool 112 and the inner surface of the cage wall 44. Regardless of the lateral position of the main spool 112 along the length of the cage 42, the pilot valve supply chamber 134 is always open to a flow of hydraulic fluid from the pump though the cage pump ports 56 in the cage wall 44. One end of a pilot valve supply passage 136, formed through the interior of the main spool 112, is open to the trough 132 while the other end of the pilot valve supply passage 136 passes though a control pressure surface 138 on the outer surface of the main spool 112 furthest from the coil spring 108 and the plug 92. In the proportional pressure control valve 20 depicted in FIGS. 1 and 2, the pilot valve supply passage 136 immediately adjacent to the control pressure surface 138 receives a screen 142 and is threaded to receive a threaded control flow restriction orifice 144. The control flow restriction orifice 144 restrains the flow rate of a control pressure flow of hydraulic fluid that passes from the cage pump ports 56 through the trough 132, the pilot valve supply passage 136, and through the control pressure surface 138 of the main spool 112. The screen 142 catches particles in the hydraulic fluid to hinder blockage of the control flow restriction orifice 144 by such particles.

An annularly-shaped stop 152 fits snugly within the interior surface of the cage wall 44 at the end of the cage 42 nearest the cage tank ports 52. A U-shaped trough 154 encircles the stop 152 and receives an O-ring 156. The O-ring 156 seals between the inner surface of the cage wall 44 and the outer surface of the stop 152. When the main spool 112 is properly disposed within the cage 42, the stop 152, the control flow restriction orifice 144, the control pressure surface 138 of the main spool 112, and the interior surface of the cage wall 44 between the stop 152 and the control pressure surface 138 establish a control pressure chamber 158. The pressure of hydraulic fluid within the control pressure chamber 158 urges the main spool 112 to move laterally along the length of the cage 42 away from the stop 152 toward the plug 92.

Passing through the middle of the stop 152 is a hollow control pressure chamber outlet passage 162. Formed on the edge of the control pressure chamber outlet passage 162 furthest from the control pressure surface 138 of the main spool 112 is a beveled valve seat 164.

Formed on the outer surface of the cage wall 44 surrounding the stop 152 are threads 172 adapted to mate with threads 174 formed on the interior surface of an annularly-shaped adaptor 176 of a tube assembly 178. Formed on the outer surface of the adaptor 176 are threads 182 adapted to mate with threads 184 formed at one end of the cavity 26 formed in the body 22. A U-shaped trough 186 encircles the adaptor 176 immediately adjacent to the threads 182 and receives an encircling O-ring 188. The O-ring 188 seals between the outer surface of the adaptor 176 and the surface of the cavity 26 in the body 22. With the adaptor 176 disposed in this position within the body 22 and mated with the cage 42, the surface of the cavity 26, the end surface of the adaptor 176, the outer surface of the cage wall 44 and the land 72 nearest to the adaptor 176 establish a hollow, annularly-shaped tank outlet chamber 192 encircling the cage 42. Hydraulic fluid flowing to the tank flows between the cage tank ports 52 and the body tank port 32 through the tank outlet chamber 192.

A pair of control pressure flow return ports 194 pass through the adaptor 176 at the end of the threads 174 and 182 immediately adjacent to the trough 186 and the O-ring 188. A pair of elongated control pressure flow return slots 196 extend across the threads 182 from the control pressure flow return ports 194 away from the trough 186 and the O-ring 188. The control pressure flow return ports 194 and the control pressure flow return slots 196 provide a passage by which the control pressure flow of hydraulic fluid, that flows out of the control pressure chamber 158 through the control pressure chamber outlet passage 162, returns to the body tank port 32 and the cage tank ports 52, and thence to the tank.

Projecting outward from the side of the annularly-shaped adaptor 176 opposite to the threads 174 and 182 is a hollow tube 202 included in the tube assembly 178. The tube 202 is rigidly attached to the adaptor 176 and sealed to it. Also rigidly attached and sealed to the tube 202 at its end furthest from the adaptor 176 is an annularly-shaped threaded tube plug 204 also included in the tube assembly 178.

Received within the adaptor 176 and positioned at the end of the tube 202 nearest the adaptor 176 is an elongated, annularly-shaped pole piece 212. A raised land 214 encircles the outer surface of the pole piece 212. When the adaptor 176 is threaded onto the cage 42, the adaptor 176 presses the land 214 against the stop 152. Thus, threading the adaptor 176 onto the cage 42 forces the stop 152 into the cage 42 and holds it there. An annularly-shaped recess 216 is formed into the end of the pole piece 212 immediately adjacent to the stop 152. A pair of elongated slots 218 are formed along the entire length of the pole piece 212 and across the land 214 to open into the recess 216. The recess 216 and the ends of the slots 218 crossing the land 214 also form part of the passage by which the control pressure flow of hydraulic fluid, that flows out of the control pressure chamber 158 through the control pressure chamber outlet passage 162, returns to the body tank port 32 and cage tank ports 52, and thence to the tank. The slots 218 allow hydraulic fluid to flow past the pole piece 212 and fill the length of the tube 202 extending outward from the adaptor 176.

Formed though the middle of the pole piece 212 is an elongated, cylindrically-shaped pin passage 222. An elongated pin 224 fits loosely within the pin passage 222 and slides freely back and forth within the length of the pin passage 222. The end of the pin passage 222 immediately adjacent to the recess 216 is formed with an enlarged diameter to provide a valve ball retaining chamber 226. The valve ball retaining chamber 226 receives a loosely fitting valve ball 228 that is free to move back and forth along the length of the valve ball retaining chamber 226. Within the proportional pressure control valve 20, the valve ball retaining chamber 226 supports the valve ball 228 in a position in which the pin 224 may urge the valve ball 228 into sealing engagement with the valve seat 164 of the stop 152.

Loosely received within the tube 202 of the tube assembly 178 between the pole piece 212 and the threaded tube plug 204 is a plunger 232. The plunger 232 is free to move back and forth within the tube 202 between the pole piece 212 and the threaded tube plug 204. The end of the plunger 232 nearest the pole piece 212 contacts the end of the pin 224 that extends out of the pole piece 212 furthest from the valve ball 228. A spring cavity 234 is formed into the end of the plunger 232 nearest the threaded tube plug 204 to receive a light, minimum pressure coil spring 236. A partially threaded, central passage 238, that passes longitudinally through the middle of the threaded tube plug 204, receives the end of the spring 236 that projects out of the end of the plunger 232. As illustrated in the plan view of FIG. 3, the outer surface of the plunger 232 parallel to the center line 24 is not formed in the shape of a full right circular cylinder. Rather, portions of the outer surface of the plunger 232 parallel to the center line 24 are formed by planar surfaces 240.

A preload adjusting screw 242 threads into the central passage 238 and contacts the end of the spring 236 within the central passage 238. Threading the preload adjusting screw 242 into the central passage 238 of the threaded tube plug 204 presses the spring 236 into the spring cavity 234 of the plunger 232. This force on the plunger 232 urges it into contact with the immediately adjacent end of the pin 224 whose far end contacts the valve ball 228. This force applied to the valve ball 228 by the preload adjusting screw 242 urges the valve ball 228 into a sealing contact with the valve seat 164 of the stop 152.

A U-shaped trough 244 encircles the end of the preload adjusting screw 242 nearest the spring 236 and receives an O-ring 246. The O-ring 246 seals between the threaded tube plug 204 and the preload adjusting screw 242 to close the end of the tube assembly 178 furthest from the body 22. Because the tube assembly 178 is formed as a sealed unit, because the O-ring 246 seals between the preload adjusting screw 242 and the threaded tube plug 204, and because the O-ring 188 seals between the adaptor 176 and the body 22, hydraulic fluid normally enters the proportional pressure control valve 20 only through the pump inlet chamber 84 and normally leaves the proportional pressure control valve 20 only through the body tank port 32 and the body clutch port 34.

The proportional pressure control valve 20 also includes an annularly-shaped solenoid coil 252 that loosely encircles the tube 202 of the tube assembly 178 immediately adjacent to the adaptor 176. An annularly-shaped spacer 254 also loosely encircles the tube 202 of the tube assembly 178 on side of the solenoid coil 252 furthest from the adaptor 176. A flux ring 253 is located between the coil shell and the adaptor 176 to enhance magnetic flux between the coil and the adaptor. A nut 256 threads onto the threaded tube plug 204 to contact the spacer 254 thereby urging it along the length of the tube assembly 178 toward the adaptor 176. Thus, force from the nut 256 holds the solenoid coil 252 in contact with the adaptor 176. The solenoid coil 252 includes a pair of electrically conductive leads 258. Applying an electrical control signal to the leads 258 produces a magnetic field within the tube 202 of the tube assembly 178. This magnetic field applies a force that pushes the plunger 232 along the length of the tube 202 toward the valve ball 228. Thus, in addition to the coil spring 236, an electric current flowing through the solenoid coil 252 also applies a force to the valve ball 228 that urges it into a sealing contact with the valve seat 164 of the stop 152.

With no electric current passing through the solenoid coil 252 of the proportional pressure control valve 20 depicted in FIGS. 1 and 2, the pressure of the hydraulic fluid supplied by the pump to the pump inlet chamber 84 is transmitted substantially undiminished to the control flow restriction orifice 144 retained in the main spool 112. The control pressure flow of hydraulic fluid passing through the control flow restriction orifice 144 fills the control pressure chamber 158 and flows out of the control pressure chamber 158 through the control pressure chamber outlet passage 162. This control pressure flow of fluid through the control pressure chamber outlet passage 162 impinges upon the valve ball 228 urging it away from the valve seat 164 on the stop 152. The pressure applied to the plunger 232 by the spring 236 applies only a light force urging the valve ball 228 back toward the valve seat 164. Therefore, when no electrical current passes through the solenoid coil 252, it requires only a low pressure for fluid within the control pressure chamber 158 to overcome the force applied to the valve ball 228 by the coil spring 236 and to push the valve ball 228 away from the stop 152.

With the valve ball 228 thus displaced away from the valve seat 164 against only the force applied by the spring 236, the control flow restriction orifice 144 located within the main spool 112 restrains the flow rate of the control pressure flow of hydraulic fluid passing through the pilot valve supply passage 136 to a low value. The resistance to this low rate of fluid flow past the valve ball 228 and through the control pressure flow return passage to the cage tank ports 52 provides a back-up pressure that is sufficiently low such that little force is applied by the fluid in the control pressure chamber 158 to the control pressure surface 138 of the main spool 112. Therefore, the force applied to the feedback pressure surface 114 of the main spool 112 by the coil spring 108 within the feedback pressure chamber 118 pushes the main spool 112 toward the stop 152.

In the proportional pressure control valve 20 depicted in FIGS. 1 and 2, varying the pressure applied to the plunger 232 by the spring 236 adjusts the hydraulic fluid pressure present in the cage clutch ports 54 of the cage 42 to a predetermined pressure valve. This is accomplished by turning the preload adjusting screw 242 within the threaded tube plug 204.

Figure 6:
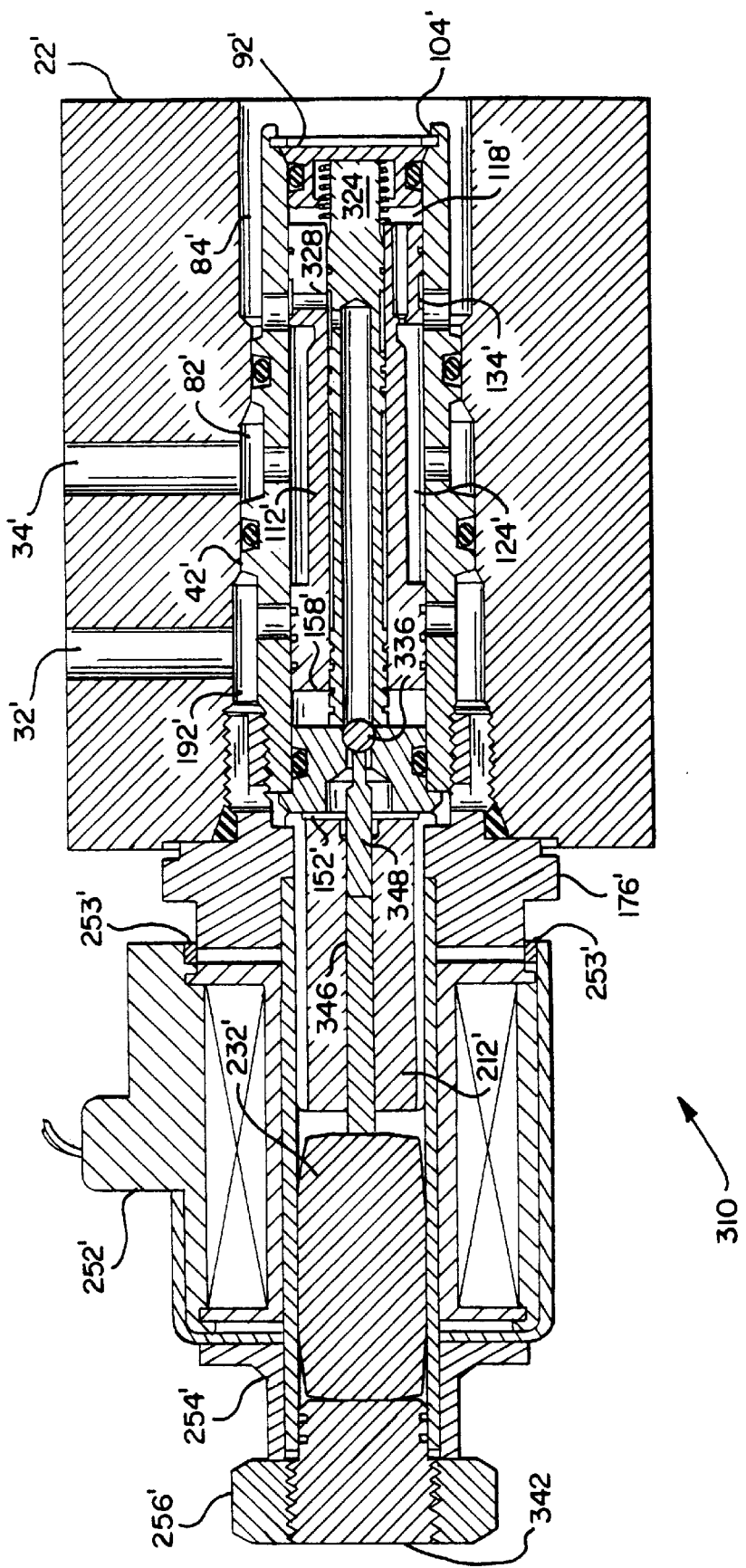
FIG. 6 is a cross-sectional plan view of the assembled proportional pressure control valve depicted in FIG. 5.

The coil spring 236, the central passage 238 in the plug 204 and the adjustable screw 242 may be eliminated in applications where back-up pressure is not required or is undesirable. Such an arrangement is illustrated in FIG. 6 and described below.

When the control pressure surface 138 of the main spool 112 is located immediately adjacent to the stop 152, the main spool 112 spool blocks substantially all fluid flow through the cage pump ports 56 to the cage clutch ports 54 while the valving chamber 124 allows fluid to flow freely from the cage clutch ports 54 to the cage tank ports 52. Because the valving chamber 124 couples the cage clutch ports 54 to the cage tank ports 52, substantially the same low pressure of hydraulic fluid is present both in the body tank port 32 and in the body clutch port 34.

Applying an electrical control signal to the leads 258 increases the force pushing the plunger 232 toward the stop 152. This increased force on the plunger 232 is applied by the pin 224 to the valve ball 228. The force from the plunger 232 urges the valve ball 228 toward the valve seat 164 thereby reducing the control pressure flow of fluid out of the control pressure chamber outlet passage 162 and increasing the pressure of fluid within the control pressure chamber 158. The increased fluid pressure within the control pressure chamber 158 presses against the control pressure surface 138, overcomes the force applied to the main spool 112 by the coil spring 108 located in the feedback pressure chamber 118, and moves the main spool 112 away from the stop 152 toward the plug 92 as illustrated in FIGS. 4A through 4D. Movement of the main spool 112 away from the stop 152 first causes the outer surface of the main spool 112 to occlude the cage tank ports 52 and then allows the valving chamber 124 to couple the cage clutch ports 54 to the cage pump ports 56. Coupling of the cage clutch ports 54 to the cage pump ports 56 increases the pressure of hydraulic fluid within the body clutch port 34.

The increased pressure of fluid in the body clutch port 34 is coupled through the cage clutch ports 54, the valving chamber 124, feedback restriction orifice 128, and the feedback pressure passage 126 to the feedback pressure chamber 118. The pressure of fluid in the feedback pressure chamber 118 presses against the feedback pressure surface 114 of the main spool 112 to oppose the force applied to the control pressure surface 138 of the main spool 112 by the fluid in the control pressure chamber 158. When the forces applied to these opposite ends of the main spool 112 become equal the main spool 112 stops moving within the cage 42 and the proportional pressure control valve 20 maintains a constant fluid pressure within the body clutch port 34. Any inequality between the forces applied simultaneously to the control pressure surface 138 and to the feedback pressure surface 114 of the main spool 112 cause the main spool 112 to move laterally within the cage 42. In response to such unequal forces, the main spool 112 moves away from the end receiving the larger force and toward the end receiving the lesser force. Because the feedback restriction orifice 128 restrains the rate at which hydraulic fluid may flow from the valving chamber 124 to the feedback pressure chamber 118, it dampens out possible oscillation of the main spool 112 within the cage 42. Operated in this manner, the solenoid coil 252, the plunger 232, the pin 224, the valve ball 228, the stop 152, and the control flow restriction orifice 144 provide an electromagnetically operated pilot valve for supplying a regulated pressure of fluid to the control pressure chamber 158 responsive to an electrical control signal.

Changing the electrical control signal so an electrical current no longer flows through the solenoid coil 252 again permits the fluid pressure from the cage pump ports 56 to overcome the force applied to the valve ball 228 and move it away from the valve seat 164 on the stop 152. Moving the valve ball 228 away from the valve seat 164 reduces the force applied to the control pressure surface 138 of the main spool 112 by fluid pressure within the control pressure chamber 158. With a lesser force being applied to the control pressure surface 138, both the force applied to the feedback pressure surface 114 by the coil spring 108 and any residual pressure in the feedback pressure chamber 118 urge the spool to move back toward the stop 152.

Applying different levels of electrical control signals provides different solenoid forces and therefore different pressures in the control chamber and the clutch in proportion to electric signals. This type of signal control makes proportional pressure control and corresponding clutch torque control possible.

Figure 5B:
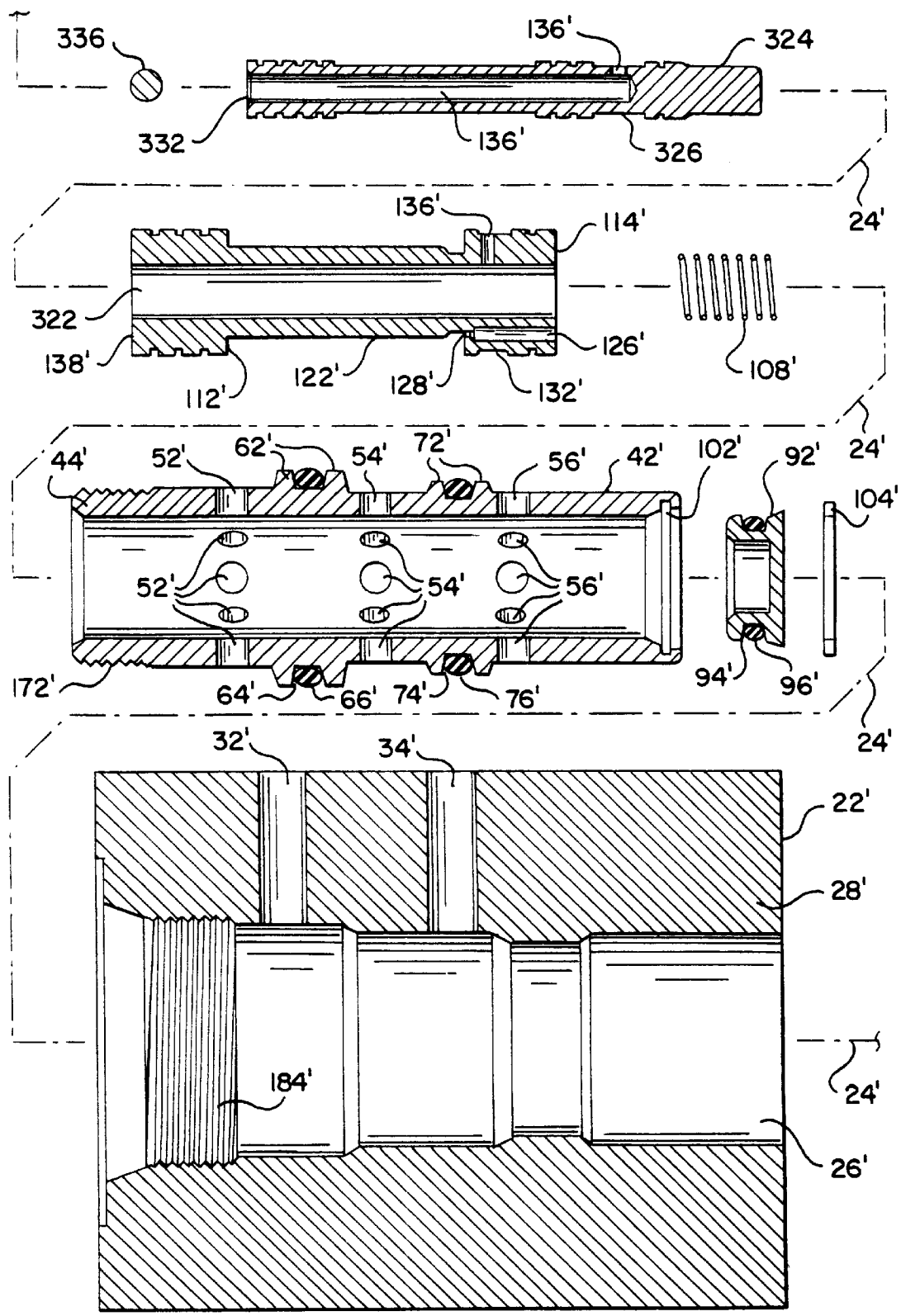
FIG. 5, made up of FIGS. 5A and 5B, is an exploded, cross-sectional plan view of a normally open proportional pressure control valve in accordance with the present invention that is adapted for control by a digital electrical control signal.

FIG. 6 depicts a cross-sectional plan view of a proportional pressure control valve referred to by the general reference character 310. FIG. 5, made up of FIGS. 5A and 5B, is an exploded, cross-sectional plan view depicting the various parts included in the proportional pressure control valve 310. Those elements depicted in FIGS. 5 and 6 that are common to the proportional pressure control valve 20 depicted in FIGS. 1 and 2 carry the same reference numeral distinguished by a prime ("'") designation. The same reference characters are used to identify the same part of the proportional pressure control valve 310 both in FIG. 5 and in FIG. 6. The proportional pressure control valve 310 depicted in FIGS. 5 and 6 is a normally open valve.

The interior of the main spool 112' of the proportional pressure control valve 310 differs from that of the proportional pressure control valve 20. Formed through the entire length of the interior of the main spool 112' is a right circular cylindrically-shaped seat spool passage 322. When assembled into the proportional pressure control valve 310, the seat spool passage 322 of the main spool 112' receives a rod-shaped seat spool 324 having a length that is greater than that of the main spool 112'. The end of the seat spool 324 extending outward beyond the feedback pressure surface 114' of the main spool 112' contacts the inner surface of the plug 92 and is surrounded by the coil spring 108'. Thus, in the proportional pressure control valve 310 the coil spring 108' presses against the feedback pressure surface 114' of the main spool 112' and not against the seat spool 324.

The outer surface of the seat spool 324 enclosed within the main spool 112' near its feedback pressure surface 114' is encircled by a trough 326. The trough 326 establishes a hollow, annularly-shaped pilot valve supply coupling chamber 328 encircling the seat spool 324 between the outer surface of the seat spool 324 and the surface of the seat spool passage 322. The pilot valve supply coupling chamber 328 forms part of the pilot valve supply passage 136' to couple the portion of the pilot valve supply passage 136' passing through the main spool 112' to the portion of the pilot valve supply passage 136' passing through the interior of the seat spool 324. Thus, as in the proportional pressure control valve 20, the pilot valve supply passage 136' of the proportional pressure control valve 310 is always open to a flow of hydraulic fluid from the pump through the cage pump ports 56' in the cage wall 44'.

Formed on the edge of the pilot valve supply passage 136' passing through the seat spool 324 that extends outward through the control pressure surface 138' of the main spool 112' is a beveled valve seat 332. In the assembled proportional pressure control valve 310, a valve ball 336 is juxtaposed with the valve seat 332 of the seat spool 324. The digital control signal proportional pressure control valve 310 depicted in FIGS. 5 and 6 omits the screen 142 and the control flow restriction orifice 144 included in the proportional pressure control valve 20 depicted in FIGS. 1 and 2.

The tube assembly 178' of the proportional pressure control valve 310 differs from the tube assembly 178 of the proportional pressure control valve 20 by substituting a solid tube plug 342 for the annularly-shaped threaded tube plug 204.

The proportional pressure control valve 310 omits the coil spring 236" included in the proportional pressure control valve 20. Accordingly, the plunger 232' of the digital normally open proportional pressure control valve 310 lacks the spring cavity 234 that is included in the plunger 232 of the analog normally closed proportional pressure control valve 20.

In the assembled proportional pressure control valve 310, a long pin 346 and a short pin 348 extend outward coaxially from the plunger 232' through the interior of the pole piece 212' toward the seat spool 324. The long pin 346 is preferably made from a non-magnetic material such as stainless steel or the like. To resist wear at the point of contact between the short pin 348 and the valve ball 336, the short pin 348 is preferably made from a material such as hardened steel or a material having similar wear resistant properties. The end of the short pin 348 furthest from the plunger 232' and nearest to the seat spool 324 is formed with a smaller diameter which allows it to enter freely into the control pressure chamber outlet passage 162' of the stop 152'. As may be appreciated by those skolled in the art, this same two-piece pin configuration may be utilized in the system illustrated on FIG. 2 and previously described above.

While in the proportional pressure control valve 20 the diameter of the control pressure chamber outlet passage 162 in the stop 152 has a uniform diameter throughout its entire length, the diameter of the control pressure chamber outlet passage 162' of the stop 152' in the proportional pressure control valve 310 has an enlarged diameter immediately adjacent to the valve seat 332 of the seat spool 324. The enlarged diameter of the control pressure chamber outlet passage 162' immediately adjacent to the valve seat 332 provides a valve ball retaining chamber 354 analogous to the valve ball retaining chamber 226 in the pole piece 212 of the proportional pressure control valve 20. A U-shaped slot 356 extends across the face of the stop 152' immediately adjacent to the main spool 112' and the seat spool 324. The slot 356 forms a portion of the control pressure chamber 158' that permits hydraulic fluid to flow into and out of that portion of the control pressure chamber 158' adjacent to the control pressure surface 138' of the main spool 112'. The diameter of the control pressure chamber outlet passage 162' on the opposite side of the stop 152' from the valve ball retaining chamber 354 that is adjacent to the pole piece 212' is also enlarged to permit hydraulic fluid to flow freely about the short pin 348 on its way to the body tank port 32' and cage tank ports 52', and thence to the tank.

Because the proportional pressure control valve 310 omits the coil spring 236" included in the proportional pressure control valve 20, unless an electrical current flows through the solenoid coil 252' there is no force urging the plunger 232' away from the solid tube plug 342 toward the valve ball 336. Therefore, when no electrical current flows through the solenoid coil 252', the force of the hydraulic fluid impinging on the valve ball 336 urges it away from the valve seat 332 of the seat spool 324 toward the interior of the stop 152' and the narrowest portion of the control pressure chamber outlet passage 162'. In this location, the valve ball 336 seals the control pressure chamber outlet passage 162' and hydraulic fluid at the full pressure supplied by the pump fills the control pressure chamber 158'. The presence of hydraulic fluid within the control pressure chamber 158' at the full pressure supplied by the pump causes the main spool 112' to move longitudinally within the cage 42 thereby coupling the cage pump ports 56' to the cage clutch ports 54' to supply hydraulic fluid at the full pressure supplied by the pump to the body clutch port 34'.

The magnetic field resulting from the application of a PWM electrical signal to the solenoid coil 252' pushes the plunger 232' away from the solid tube plug 342 toward the valve ball 336. The combined long pin 346 and short pin 348 transmit this movement of the plunger 232' to the valve ball 336 pushing it toward the valve seat 332 of the seat spool 324. Movement of the valve ball 336 toward the valve seat 332 simultaneously allows hydraulic fluid to flow from the control pressure chamber 158' into the control pressure chamber outlet passage 162' and restricts the flow of hydraulic fluid through the pilot valve supply passage 136' in the seat spool 324 into the control pressure chamber 158'. Thus, a PWM electrical signal applied to the solenoid coil 252' reduces the pressure of the hydraulic fluid in the control pressure chamber 158' thereby causing longitudinal movement of the main spool 112' within the cage 42' that reduces the pressure of hydraulic fluid within the body clutch port 34'. Operated in this manner, the solenoid coil 252', the plunger 232', the pins 346 and 348, the valve ball 336, the stop 152', and the seat spool 324 provide an electromagnetically operated pilot valve for supplying a regulated pressure of fluid to the control pressure chamber 158' responsive to an electrical control signal.

Figure 7A:
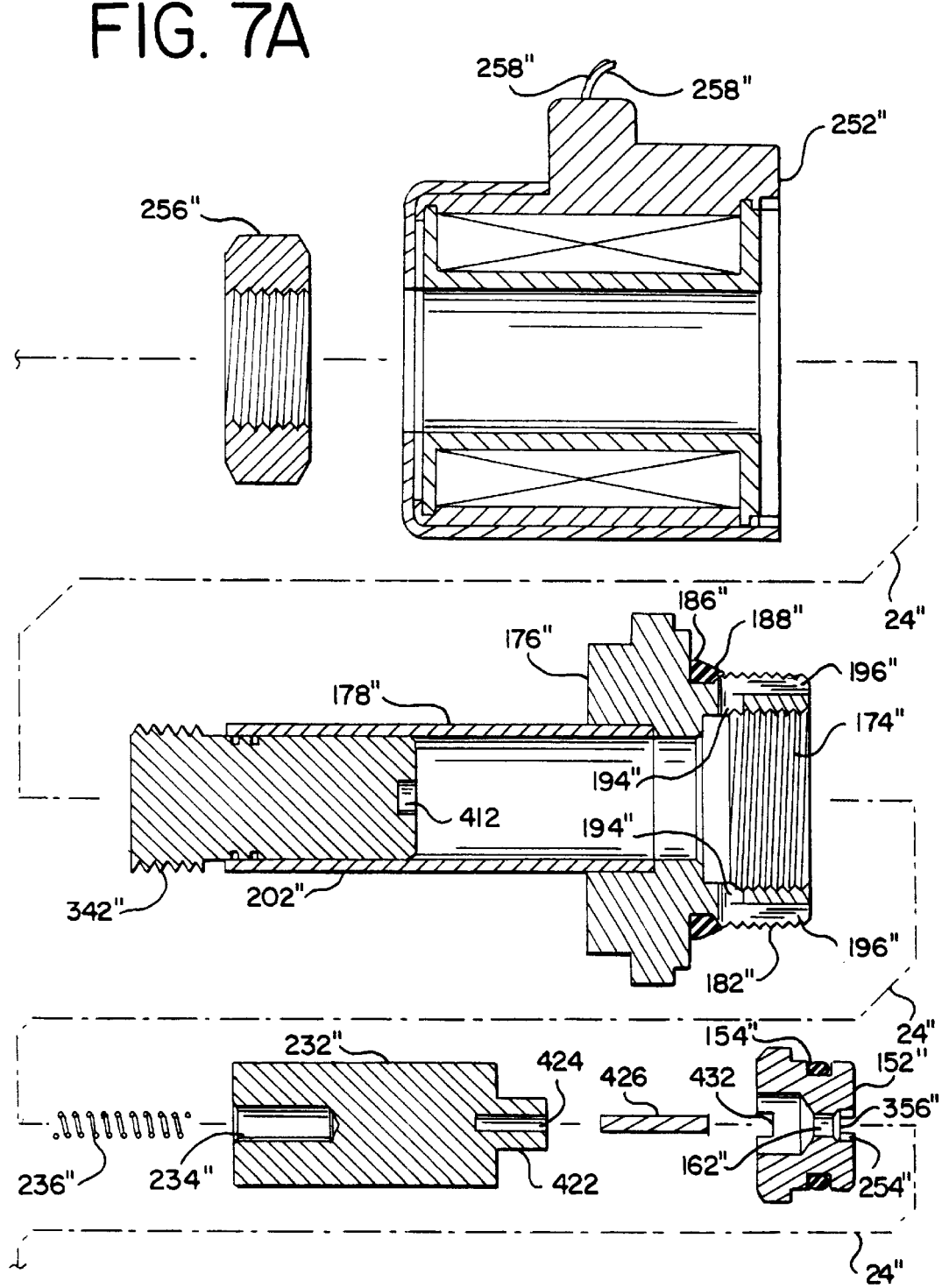
FIG. 7, made up of FIGS. 7A and 7B, is an exploded, cross-sectional plan view of a normally closed proportional pressure control valve in accordance with the present invention that is adapted for control by a digital electrical control signal.
Figure 7B:
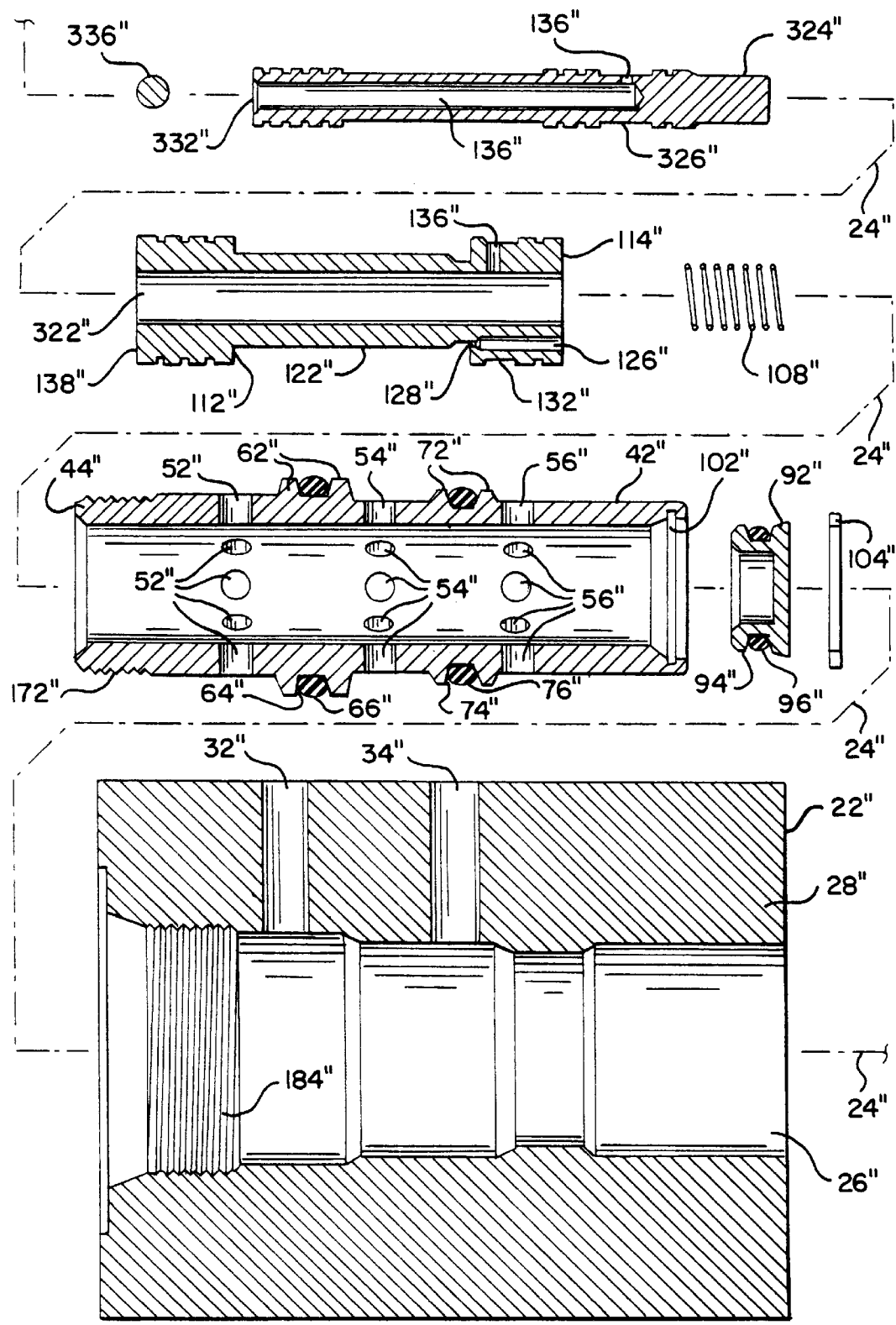
Figure 8:
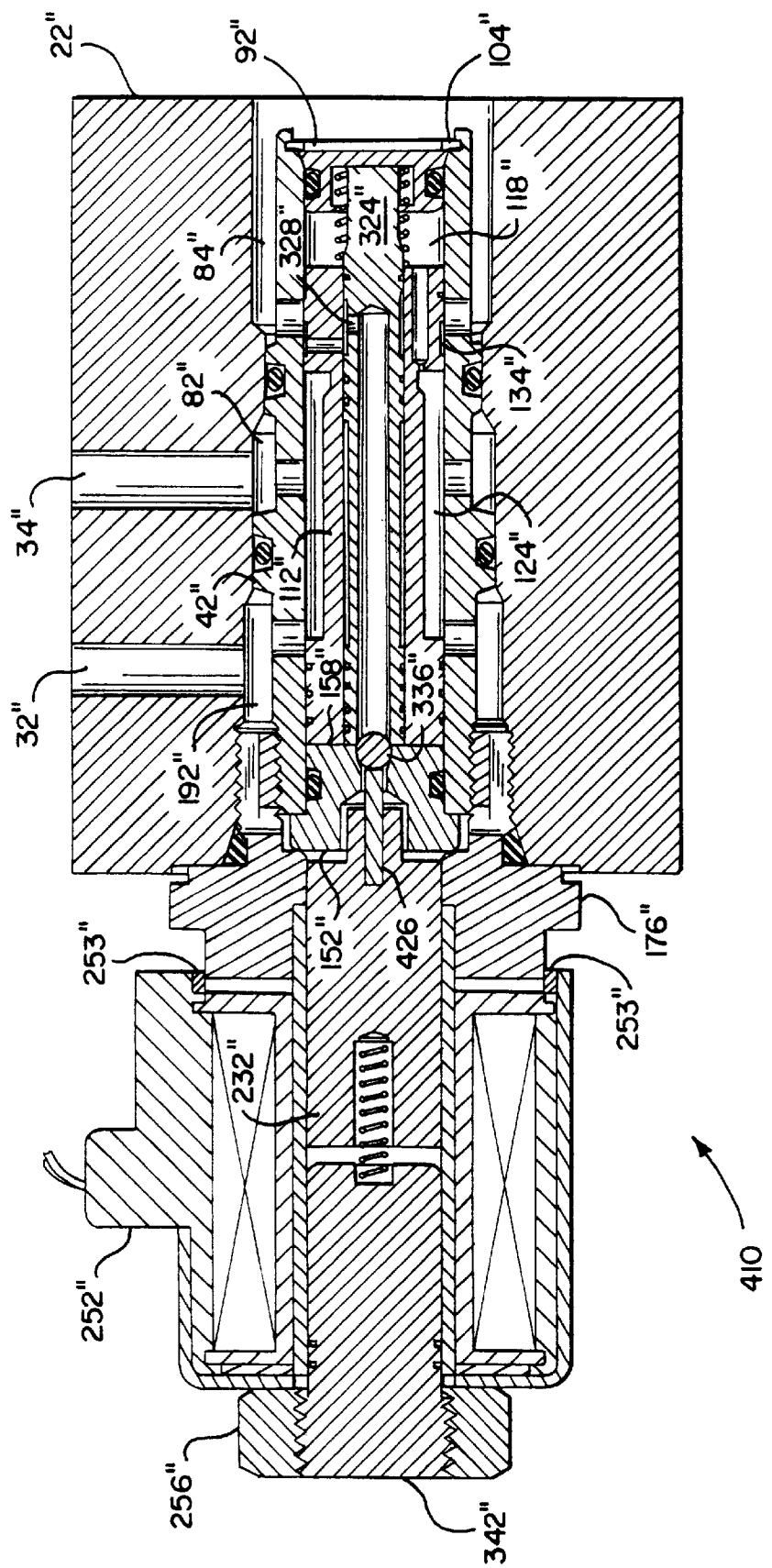
FIG. 8 is a cross-sectional plan view of the assembled proportional pressure control valve depicted in FIG. 7.

FIG. 8 depicts a cross-sectional plan view of a proportional pressure control valve referred to by the general reference character 410. FIG. 7, made up of FIGS. 7A and 7B, is an exploded, cross-sectional plan view depicting the various parts included in the proportional pressure control valve 410. Those elements depicted in FIGS. 7 and 8 that are common to the proportional pressure control valve 20 depicted in FIGS. 1 and 2 or to the proportional pressure control valve 310 depicted in FIGS. 5 and 6 carry the same reference numeral distinguished by a double prime ("''") designation. The same reference characters are used to identify the same part of the proportional pressure control valve 410 both in FIG. 7 and in FIG. 8. The proportional pressure control valve 410 depicted in FIGS. 7 and 8 is a normally closed valve that is adapted for control by a digital pulse width modulated ("PWM") electrical control signal.

The tube 202" of the proportional pressure control valve 410 is shorter than the tube 202 of the tube assemblies 178 and 178' of the proportional pressure control valves 20 and 310. Because of the shorter tube 202", the proportional pressure control valve 410 omits the spacer 254. The solid tube plug 342" of the proportional pressure control valve 410 extends further into the tube 202' than the tube plug 342 of the proportional pressure control valve 310 and functions as a pole piece for the proportional pressure control valve 410. Formed into the end of the solid tube plug 342" nearest to the adaptor 176" is a plug spring cavity 412. In the assembled proportional pressure control valve 410, the plug spring cavity 412 receives one end of the coil spring 236". The other end of the spring 236" is received into the spring cavity 234" formed into the plunger 232" of the proportional pressure control valve 410 immediately adjacent to the solid tube plug 342".

Figure 3:
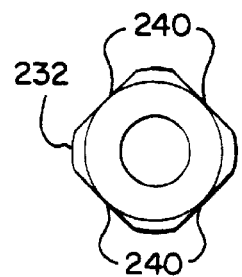
FIG. 3 is a plan view of a plunger included in the proportional pressure control valve depicted in FIGS. 1 and 2 taken along the line 3—3 in FIG. 1.
Figure 4A:
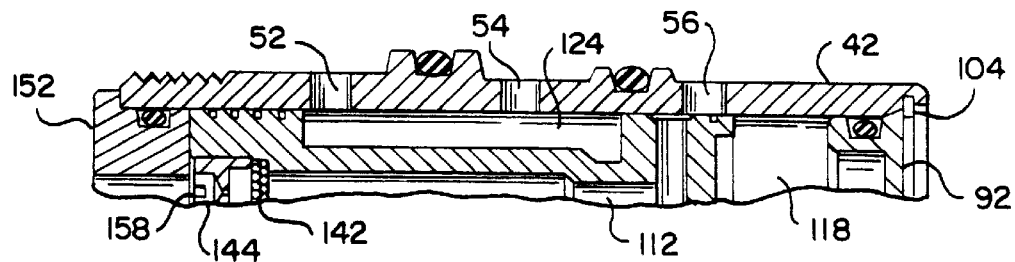
FIG. 4A through 4D are cross-sectional plan views of a portion of the assembled proportional pressure control valve of FIGS. 1 and 2 illustrating motion of the main spool relative to the cage.
Figure 4B:
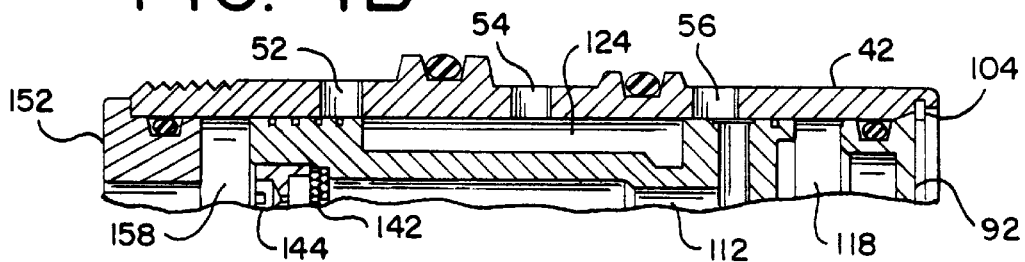
Figure 4C:
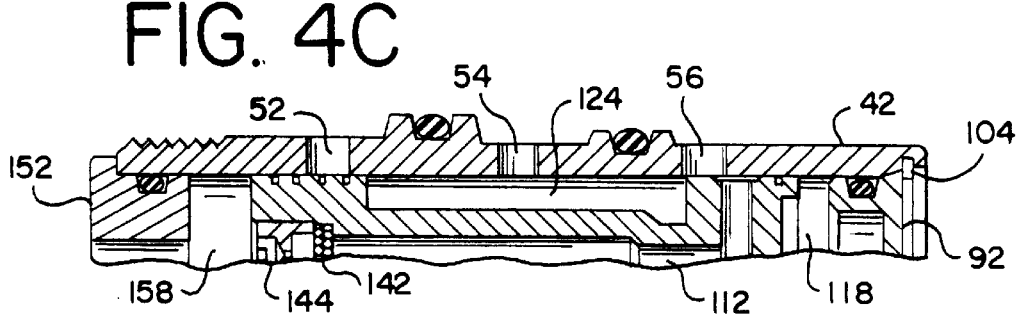
Figure 4D:
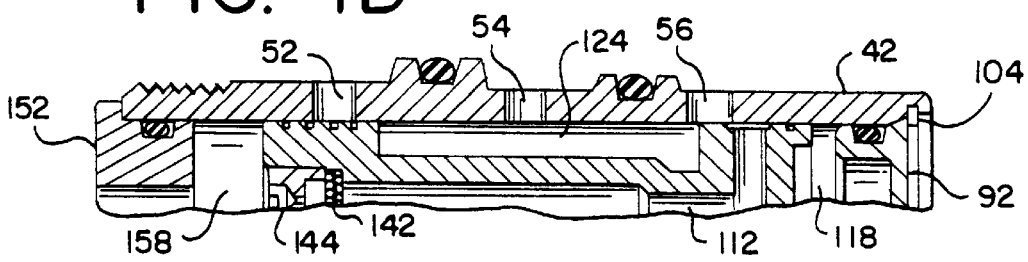

Projecting outward from the end of the plunger 232" furthest from the spring cavity 234" is a protrusion 422. A pin cavity 424, formed into the protrusion 422, receives a pin 426. The outer surface of the plunger 232" parallel to the center line 24" is not formed in the shape of a full right circular cylinder. Rather, the shape of the outer surface of the plunger 232" parallel to the center line 24" is similar to that of the plunger 232 as depicted in FIG. 3.

There are only two substantial differences between stop 152" of the normally closed proportional pressure control valve 410 and the stop 152' of the normally open proportional pressure control valve 310. Because the proportional pressure control valve 410 omits the pole piece 212' included in the proportional pressure control valve 310, the width of the stop 152" between the cage 42" and the adaptor 176" is greater than that of the stop 152'. Thus, in the assembled proportional pressure control valve 410, the adaptor 176" contacts the stop 152" and directly forces it into the cage 42" and holds it there. Also because the proportional pressure control valve 410 lacks the pole piece 212', a U-shaped slot 432 is formed across the face of the stop 152" immediately adjacent to the plunger 232". The slot 432 forms a portion of the passage by which hydraulic fluid, that flows out of the control pressure chamber 158" through the control pressure chamber outlet passage 162", returns to the body tank port 32" and cage tank ports 52", and thence to the tank.

The coil spring 236 included in the proportional pressure control valve 410 applies sufficient force to the valve ball 336" through the plunger 232" and the pin 426 that, in the absence of an electric current flowing through the solenoid coil 252", the valve ball 336" seals the pilot valve supply passage 136" thereby preventing hydraulic fluid from entering into and pressurizing the control pressure chamber 158". As explained previously, the absence of any pressure on the hydraulic fluid in the control pressure chamber 158" causes the proportional pressure control valve 410 to block all fluid flow from the pump inlet chamber 84" to the body clutch port 34" and relieves all pressure from the hydraulic fluid in the body clutch port 34".

Application of a PWM signal to the solenoid coil 252" of the proportional pressure control valve 410 overcomes the force applied to the plunger 232" by the spring 236" and pulls the plunger 232" away from the valve ball 336" toward the solid tube plug 342". Pulling the plunger 232" toward the solid tube plug 342" releases the force urging the valve ball 336" into the valve seat 332" of the seat spool 324". The force of the hydraulic fluid impinging on the valve ball 336" urges it away from the valve seat 332" of the seat spool 324" toward the interior of the stop 152". Thus spaced apart from the valve seat 332", the valve ball 336" allows hydraulic fluid to flow into and raise the pressure of hydraulic fluid within the control pressure chamber 158". The pressurized hydraulic fluid within the control pressure chamber 158" causes the main spool 112" to move laterally along the length of the cage 42" and to couple the cage pump ports 56" to the cage clutch ports 54" thereby supplying hydraulic fluid to the body clutch port 34". Operated in this manner, the solenoid coil 252", the plunger 232", the pin 426, the valve ball 336", the stop 152", and the seat spool 324" provide an electromagnetically operated pilot valve for supplying a regulated pressure of fluid to the control pressure chamber 158" responsive to an electrical control signal.

A normally open proportional pressure control valve adapted for control by an analog electrical control signal may be constructed by substituting certain elements from the normally closed proportional pressure control valve 410 for elements of the normally closed proportional pressure control valve 20. Such a normally open proportional pressure control valve may be assembled by incorporating the tube assembly 178", the spring 236", and a plunger 232" that lacks the protrusion 422 of the proportional pressure control valve 410 for the corresponding elements of the proportional pressure control valve 20. The stop 152 of such an analog normally open valve must also be modified from that included in the proportional pressure control valve 20 by making it thicker so the adaptor 176 of the tube assembly 178 may force the stop 152 into the cage 42, and by providing structures that will support the valve ball 228 at the valve seat 164 analogous to the valve ball retaining chamber 226 in the pole piece 212. The stop 152 must also be modified to provide a passage by which hydraulic fluid, that flows out of the control pressure chamber 158 through the control pressure chamber outlet passage 162, may return to the body tank port 32 and cage tank ports 52.

In such a modified valve, if no current flows through the solenoid coil 252, the force of the spring 236" urges the valve ball 228 into sealing relationship with the valve seat 164 thereby pressurizing the hydraulic fluid within the control pressure chamber 158. Supplying an analog electrical control current to the solenoid coil 252 of such a modified valve applies a magnetic field to the plunger 232" that overcomes the force of the spring 236 and pulls the plunger 232" away from the valve ball 228 thereby relieving the pressure of hydraulic fluid within the control pressure chamber 158. Operated in this manner, the solenoid coil 252", the plunger 232", the pin 426, the valve ball 228, the modified stop 152, and the control flow restriction orifice 144 provide an electromagnetically operated pilot valve responsive to an analog current for supplying a regulated pressure of fluid to the control pressure chamber 158 responsive to an electrical control signal.

Figure 9:
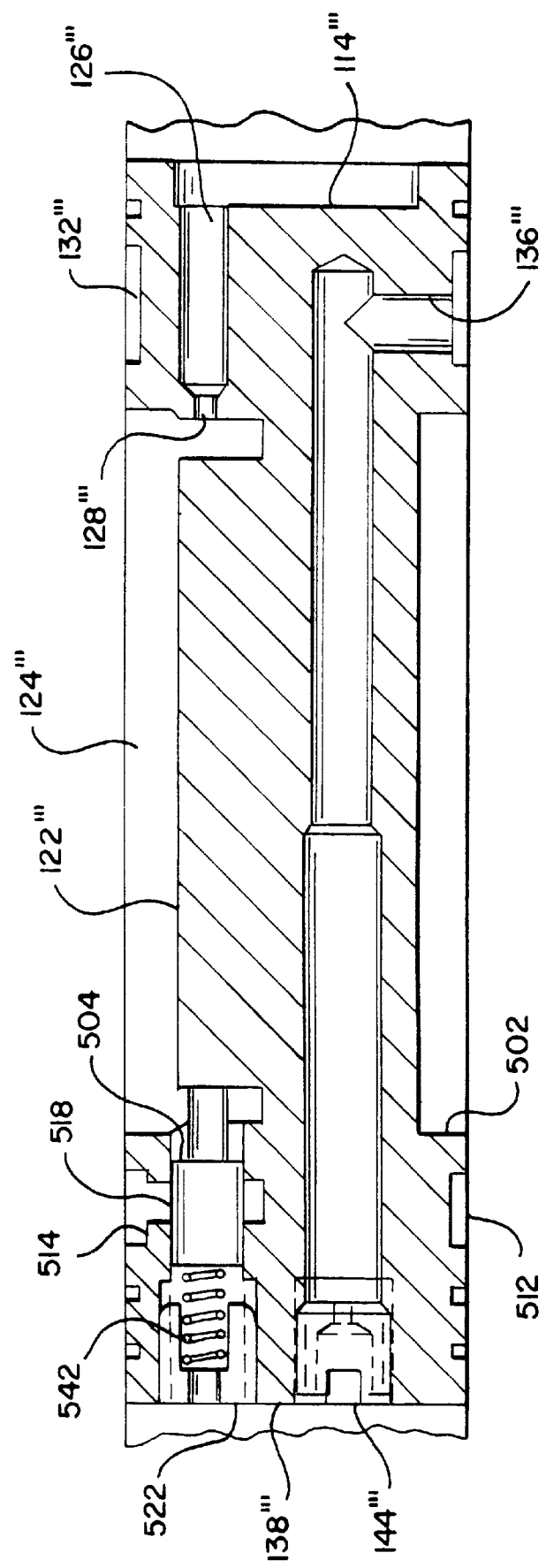
FIG. 9 is a cross-sectional plan view of a spool in accordance with the present invention including a pressure spike suppression check valve for relieving any abnormally high pressure that occurs in the clutch port of the cage.

Referring now to FIG. 9, depicted there is a cross-sectional plan view of a main spool 502 in accordance with the present invention that also includes a pressure spike suppression check valve 504. Those elements depicted in FIG. 9 that are common to the main spool 112 of the proportional pressure control valve 20 depicted in FIGS. 1 and 2 carry the same reference numeral distinguished by a triple prime ("'''") designation.

The main spool 502 includes a narrow U-shaped trough 512 formed into the outer surface of the main spool 502 between the control pressure surface 138''' of the main spool 502 and the trough 122''' that establishes the hollow, annularly-shaped valving chamber 124'''. The trough 512 establishes a hollow, annularly-shaped pressure spike pilot chamber 514 encircling the main spool 502 between its outer surface and the inner surface of the cage 42''' (not illustrated in FIG. 9). The pressure spike pilot chamber 514 is always open to the cage tank ports 52''' (not illustrated in FIG. 9). A pressure spike pilot valve cavity 518 extending between the trough 122''' and the control pressure surface 138''' opens into the pressure spike pilot chamber 514. The pressure spike pilot valve cavity 518 is open to the valving chamber 124''' through the surface of the trough 122'''. Threads formed at the end of the pressure spike pilot valve cavity 518 adjacent to the control pressure surface 138''' receive a threaded plug 522. The pressure spike suppression check valve 504 fits snugly within the pressure spike pilot valve cavity 518 to normally block any flow among the valving chamber 124''', the control pressure chamber 158''' and the pressure spike pilot chamber 514 due to the pressure difference between the control pressure chamber 158 and valving chamber 124 and a spring 524 located between pressure spike suppression check valve 504 and the pressure spike pilot orifice 522. Spring 524 provides a biasing force to prevent unwated oscillation of pressure spike suppression check valve 504.

If a clutch, or any other hydraulically operated device, reaches the mechanical limit of its travel and hydraulic fluid flow through the cage clutch ports 54''' stops abruptly, the fluid pressure on the side of the pressure spike suppression check valve 504 open to the valving chamber 124''' rises abruptly. The pressure spike suppression check valve 504 is constructed such that when the pressure of the hydraulic fluid on the side open to the valving chamber 124' exceeds the pressure of the hydraulic fluid applied to the other side of the valve 504, the valve 504 opens to permit fluid to flow between the valving chamber 124''' and the pressure spike pilot chamber 514. Since the pressure spike pilot chamber 514 is always open to the cage tank ports 52''', fluid flows from the valving chamber 124''' to the cage tank ports 52 to relieve the abnormally high pressure within the cage clutch ports 54'''. When the pressure applied to the pressure spike suppression check valve 504 from the trough 122''' once again equals or becomes less than the pressure applied to the valve 504 from the control pressure surface 138''', the pressure spike suppression check valve 504 once again closes to prevent fluid from flowing between the valving chamber 124''' and the pressure spike pilot chamber 514.

Industrial Applicability

While the disclosed embodiment describes certain preferred locations for various passages in the valve such as the pilot valve supply passage 136 supplying hydraulic fluid from the cage pump ports 56 to the pilot valve, and the feedback pressure passage 126 from the valving chamber 124 to the feedback pressure chamber 118, those passages need not necessarily be located exactly as described above. For example, the pilot valve supply passage 136 could be formed through the body 22 and the adaptor 176 rather than through the main spool 112 in the proportional pressure control valve 20, or through the combined main spool 112' and the seat spool 324 in the proportional pressure control valve 310. Analogously, the feedback pressure passage 126 need not be formed through the main spool 112. Rather, the feedback pressure passage 126 could be formed through the cage wall 44. Similarly, the pressure spike pilot valve cavity 518 could be formed through the cage wall 44''' and the pressure spike suppression check valve 504 be located in the cage 42''' rather than in the main spool 502.

Comparatively large passages in the pilot valve of the proportional pressure control valves 310 and 410 adapted for use with a PWM control signal permit omission of the screen 142 included in valves adapted for control by an analog signal. If particles in the hydraulic fluid cause blockage of the passages in the valves 310 or 410, then a screen, similar to the screen 142 included in the proportional pressure control valve 20, may be suitably incorporated into either the main spool or the seat spool of the valves 310 or 410.

While the solenoid coil 252 of the proportional pressure control valves adapted for control by an analog signal, a pulse width modulated ("PWM") signal and the like, it may be desirable to use this valve as a solenoid on-off valve provided a small amount of bleeding flow is acceptable. Such an on-off valve assures the benefits of using a small inexpensive coil to control comparatively large flow.

In distinction to the valves 20 and 310, the valve 410, when used in the proportional control mode, requires a pluse width modulated ("PWM") driver with a "peak-and-hold" means to develop sufficient magnetic forces to overcome the force provided by the compressed coil spring which otherwise cannot be overcome at lesser values of current. It has been determined that a usable pulse width modulation frequency range will be approximately from about 50 Hz to about 500 Hz.

While the body 22 has been described in connection with the preferred embodiment of the invention, the body 22 is not essential to the functioning of the valve. Rather, as described above, the body 22 merely provides a mechanical housing for the cage 42 and for joining the cage 42 respectively with the pump, the tank and the clutch. Thus, a valve in accordance with the present invention need not include the body 22. Rather, other structures, such as the case that mechanically encloses the transmission for an automotive vehicle, could itself directly incorporate the structure and provide the function of the body 22 as described above.

While the present invention has been described for use in hydraulic transmissions, its usefulness in other hydraulic systems will be understood by those skilled in the art of hydraulic systems. Such uses may include but are not limited to hydraulic braking systems, hydraulic lifting systems and such similar hydraulic systems using proportional control valves.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method for operating a proportional pressure control cartridge valve comprising the steps of:

supplying pressurized hydraulic fluid to a pump port formed through a wall of a hollow cage;

supplying a flow of hydraulic fluid from the pump port to an electromagnetically operated pilot valve through a pilot valve supply passage formed in a spool;

supplying a regulated control pressure of fluid to a control pressure chamber within the cage which control pressure is regulated by an electrical control signal applied to the electromagnetically operated pilot valve proportional pressure control valve, the control pressure chamber including a control pressure surface located on the spool, the spool fitting snugly within the hollow cage and being moveable therein, said control pressure applied to the control pressure surface urging the spool to move relative to the cage to a position in which the spool allows a flow of hydraulic fluid to pass between the pump port in the wall of the cage to a clutch port also formed through the wall of the cage while simultaneously obstructing any flow of hydraulic fluid between the clutch port and a tank port also formed through the wall of the cage;

supplying a feedback pressure of fluid from the clutch port to a feedback pressure chamber within the cage, the feedback pressure chamber including a feedback pressure surface on the spool, said feedback pressure applied to the feedback pressure surface urging the spool to move relative to the cage to a position in which the spool obstructs any flow of hydraulic fluid between the pump port and the clutch port while simultaneously allowing a flow of hydraulic fluid to pass between the clutch port and the tank port;

restraining the rate at which fluid may flow between the clutch port in the cage and the feedback pressure chamber; and relieving any abnormally high pressure that occurs in the clutch port.

2. The method for operating a proportional pressure control valve of claim 1 wherein the abnormally high pressure is relieved by venting fluid from the clutch port to the tank port.

3. The method for operating a proportional pressure control valve of claim 1 wherein said regulated control pressure of fluid that is supplied to the control pressure chamber is generated by supplying a control pressure flow of fluid from the pump port to the control pressure chamber at a flow rate that is regulated in response to the electrical control signal applied to the proportional pressure control valve, and by allowing the fluid to flow out of the control pressure chamber at a restrained flow rate.

4. The method for operating a proportional pressure control valve of claim 1 wherein said regulated control pressure of fluid that is supplied to the control pressure chamber is generated by supplying a control pressure flow of fluid from the pump port to the control pressure chamber at a restrained flow rate, and by allowing the fluid to flow out of the control pressure chamber at a rate that is regulated in response to the electrical control signal applied to the proportional pressure control valve.

5. The method for operating a proportional pressure control valve of claim 1 wherein said regulated control pressure of fluid that is supplied to the control pressure chamber is generated by supplying a control pressure flow of fluid from the pump port to the control pressure chamber at a flow rate that is regulated in response to the electrical control signal applied to the proportional pressure control-valve, and by allowing the fluid to flow out of the control pressure chamber at a rate that is also regulated in response to the electrical control signal.

* * * * *